United States Patent
Kwak

(10) Patent No.: US 10,042,442 B2
(45) Date of Patent: Aug. 7, 2018

(54) ACCESSORY, ELECTRONIC DEVICE, AND METHOD OF PROCESSING INPUT IN ELECTRONIC DEVICE

(71) Applicant: Samsung Electronics Co., Ltd., Gyeonggi-do (KR)

(72) Inventor: Tae-Won Kwak, Seoul (KR)

(73) Assignee: Samsung Electronics Co., Ltd (KR)

( * ) Notice: Subject to any disclaimer, the term of this patent is extended or adjusted under 35 U.S.C. 154(b) by 91 days.

(21) Appl. No.: 15/347,390

(22) Filed: Nov. 9, 2016

(65) Prior Publication Data
US 2017/0168593 A1  Jun. 15, 2017

(30) Foreign Application Priority Data

Dec. 9, 2015 (KR) .......................... 10-2015-0175121

(51) Int. Cl.
| | |
|---|---|
| *G06F 3/0354* | (2013.01) |
| *G06F 3/038* | (2013.01) |
| *G06F 1/16* | (2006.01) |
| *G06F 3/041* | (2006.01) |

(52) U.S. Cl.
CPC ............ *G06F 3/038* (2013.01); *G06F 1/1607* (2013.01); *G06F 1/1669* (2013.01); *G06F 3/03545* (2013.01); *G06F 3/0416* (2013.01); *G06F 2203/04108* (2013.01)

(58) Field of Classification Search
CPC .. G06F 1/1669; G06F 3/03545; G06F 3/0338; G06F 3/041–3/047
USPC .... 178/18.01–19.07; 345/161, 169, 173–179
See application file for complete search history.

(56) References Cited

U.S. PATENT DOCUMENTS

| | | | | |
|---|---|---|---|---|
| 5,132,671 A | * | 7/1992 | Louis .................. | G06F 3/03547 178/19.01 |
| 5,287,121 A | * | 2/1994 | Louis .................. | G06F 3/03547 178/18.01 |
| 6,903,730 B2 | | 6/2005 | Mathews et al. | |
| 7,221,360 B2 | * | 5/2007 | Defuans ............... | G06F 1/1626 178/19.01 |
| 7,356,769 B2 | * | 4/2008 | Lehtonen .............. | G06F 1/1626 345/157 |

(Continued)

FOREIGN PATENT DOCUMENTS

JP    2003186619    7/2003

*Primary Examiner* — Michael Pervan
(74) *Attorney, Agent, or Firm* — The Farrell Law Firm, P.C.

(57) ABSTRACT

The present disclosure relates to an accessory detachably coupled to an electronic device, the electronic device, and a method of processing an input in the electronic device. The accessory includes a body part located on at least one surface of the electronic device when the accessory is attached to the electronic device, an opening into which a part of a pen is inserted, a depression into which a pen point of the pen is inserted, and a pen accommodation part that comprises a lateral portion located between the opening and the depression and a cavity located below the lateral portion to allow the pen to move when inserted, where the body part is formed of a magnetic material so as to be attached to and detached from the electronic device, and where the cavity contains a conductive material through which a signal generated from the pen when inserted into the depression is transferred to a touch panel of the electronic device.

19 Claims, 22 Drawing Sheets

(56) References Cited

U.S. PATENT DOCUMENTS

| | | | | |
|---|---|---|---|---|
| 7,391,410 | B2* | 6/2008 | Lutnaes | G06F 1/1626 345/161 |
| 8,305,364 | B2* | 11/2012 | Huang | G06F 3/03545 345/161 |
| 8,816,961 | B2* | 8/2014 | Buil | G06F 3/0416 345/161 |
| 8,847,979 | B2* | 9/2014 | Smith | G06F 3/01 345/169 |
| 2003/0076302 | A1 | 4/2003 | Langstraat | |
| 2004/0155862 | A1* | 8/2004 | Higginson | G05G 1/06 345/156 |
| 2009/0020344 | A1* | 1/2009 | Ringholz | G06F 3/03545 178/19.05 |
| 2010/0006350 | A1* | 1/2010 | Elias | G06F 3/03545 178/18.06 |
| 2010/0302168 | A1* | 12/2010 | Giancarlo | G06F 1/1662 345/169 |
| 2011/0279370 | A1* | 11/2011 | Wang | G06F 1/1626 345/161 |
| 2012/0327044 | A1* | 12/2012 | Zeliff | G06F 3/044 345/179 |
| 2012/0327046 | A1* | 12/2012 | Sung | G06F 3/03545 345/179 |
| 2014/0285422 | A1 | 9/2014 | Kang et al. | |
| 2014/0333542 | A1* | 11/2014 | Barreca | G06F 1/1669 345/169 |
| 2015/0153774 | A1* | 6/2015 | Oueslati | G06F 1/1626 345/161 |

\* cited by examiner

ACCESSORY, ELECTRONIC DEVICE, AND METHOD OF PROCESSING INPUT IN ELECTRONIC DEVICE

PRIORITY

This application claims priority under 35 U.S.C. § 119(a) to Korean Patent Application Serial No. 10-2015-0175121, which was filed in the Korean Intellectual Property Office on Dec. 9, 2015, the entire content of which is incorporated herein by reference.

BACKGROUND

1. Field of the Disclosure

The present disclosure relates generally to a means for providing input to an electronic device, and in particular to an electronic device, an accessory that is attached to and detached from the electronic device, and a method of processing an input in the electronic device.

2. Description of the Related Art

In recent years, various electronic devices have been developed to include various functions. The electronic devices are provided with display units for the effective use of the various functions. For example, smart phones have, on the front sides thereof, display units (e.g., touch screens) that respond to touches. The electronic devices (e.g., smart phones) may receive inputs of fingers or input units (e.g., stylus pens, digitizer pens, etc.) and may output various types of data based on the received inputs.

In addition, various types of applications (e.g., also referred to as "Apps") may be installed and executed on the electronic devices. Various input units (e.g., touch screens, buttons, mouses, keyboards, sensors, etc.) may be used to execute and control the applications in the electronic devices.

However, a method is needed for using a pen to perform various operations of an electronic device.

SUMMARY

The present disclosure has been made to address at least the problems and disadvantages described above, and to provide at least the advantages described below.

Accordingly, an aspect of the present disclosure, is to detect a location of a pen and a vertical distance of the point of the pen from a display of an electronic device, when a user moves the pen on the display, in order to process the pen input and perform various operations.

Another aspect of the present disclosure, is to determine whether a pen is located at a predetermined distance from an electronic device, and to output preset data (e.g., text data or virtual secondary display) based on the location of the pen.

Another aspect of the present disclosure, is to determine whether a pen is located at a predetermined distance from an electronic device or at a predetermined location on a display of the electronic device, and to set location coordinates in order to identify the accurate location of the pen.

Another aspect of the present disclosure, is to detect the movement of a pen fixed to an accessory when the accessory is mounted to an electronic device, and to control at least some data according to the movement of the pen in a set coordinate system of a display of the electronic device.

Another aspect of the present disclosure, is to control an object displayed on a display of an electronic device by identifying a pen input to be a joystick input, thereby controlling the object even without displaying an area on the display for controlling the object.

In accordance with an aspect of the present disclosure, an accessory detachably coupled to an electronic device is provided. The accessory includes a body part located on at least one surface of the electronic device when the accessory is attached to the electronic device, an opening into which a part of a pen is inserted, a depression into which a pen point of the pen is inserted, and a pen accommodation part that comprises a lateral portion located between the opening and the depression and a cavity located below the lateral portion to allow the pen to move when inserted, where the body part is formed of a magnetic material so as to be attached to and detached from the electronic device, and where the cavity contains a conductive material through which a signal generated from the pen when inserted into the depression is transferred to a touch panel of the electronic device. In accordance with another aspect of the present disclosure, an electronic device having an accessory detachably coupled thereto is provided. The electronic device includes a display, a touch panel, and a processor. The accessory includes a body part that is formed of a magnetic material so as to be attached to and detached from the touch panel, and a fixing member that has a cavity through which a pen moves when a pen point of the pen is inserted. The processor identifies an input of the pen, through the touch panel, when the pen is detected for a first predetermined period of time or with a predetermined signal strength, and the accessory is detected to be attached to the touch panel, sets coordinates of the pen according to the identified input of the pen, and controls an object, which is displayed on the display, according to a movement of the pen in the set coordinates.

In accordance with another aspect of the present disclosure, a method of processing an input in an electronic device is provided. The method includes detecting a signal generated from a pen mounted on a fixing member, when the signal generated from the pen for informing that the pen is mounted on the fixing member is received through a touch panel of the electronic device, calculating an angle between the pen and the touch panel of the electronic device by identifying a location of the pen that corresponds to a strength of an input of the pen, when the input of the pen is received with a predetermined strength for a predetermined period of time, and controlling an object displayed through the electronic device, based on the calculated angle.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1A:
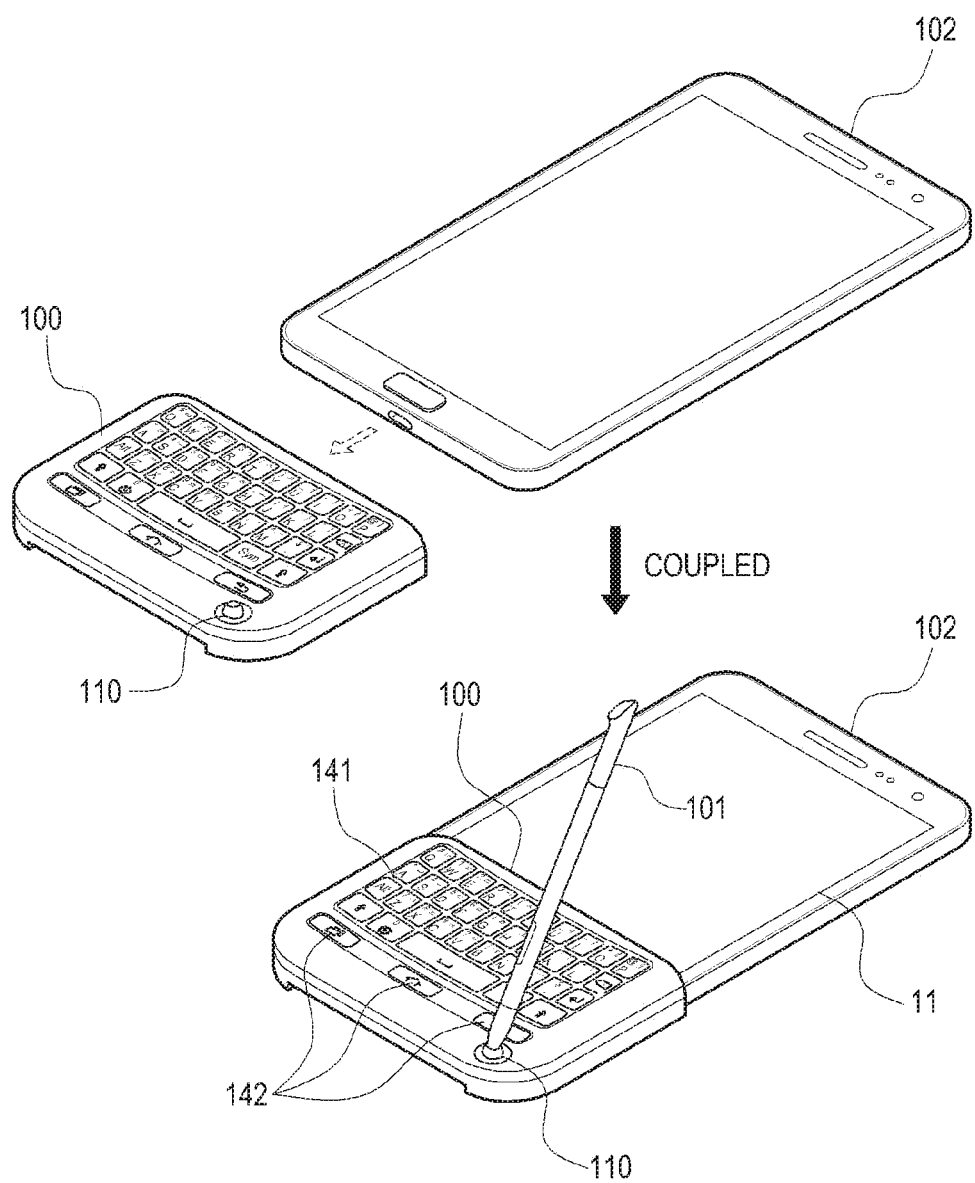
FIG. 1A is a perspective view of a case coupled to an electronic device, according to an embodiment of the present disclosure.

Hereinafter, various embodiments of the present disclosure will be described with reference to the accompanying drawings. In describing the drawings, similar reference numerals may be used to designate similar constituent elements. However, it should be understood that there is no intent to limit the present disclosure to the particular forms disclosed herein; rather, the present disclosure should be construed to cover various modifications, equivalents, and/or alternatives of embodiments of the present disclosure. As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expressions "A or B", "at least one of A and B", and "at least one of A or B" refer to all of (1) including A, (2) including B, or (3) including all of A and B.

The expressions "first", "second", etc., used herein, may modify various components regardless of the order and/or the importance, but does not limit the corresponding components. For example, a first user device and a second user device indicate different user devices, although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between the first and second elements. In contrast, when an element (e.g., first element) is referred to as being "directly connected," or "directly coupled" to another element (e.g., second element), there are no elements (e.g., third element) interposed between the first element and the second element.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined herein may not be construed to exclude embodiments of the present disclosure.

An electronic device, according to various embodiments of the present disclosure, may include at least one of a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments of the present disclosure, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine Automatic Teller Machine (ATM), Point Of Sales (POS) machine, or Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device, according to various embodiments of the present disclosure, may be a combination of one or more of the aforementioned various devices.

The electronic device, according to some embodiments of the present disclosure, may be a flexible device.

Further, the electronic device, according to an embodiment of the present disclosure, is not limited to the aforementioned devices, and may include a new electronic device according to the development of new technologies.

According to various embodiments of the present disclosure, a pen, which is a pen-shaped input device, refers to a device for entering data into an electronic device by generating an electrical signal and may be implemented in various sizes and shapes. For example, the pen may have a structure in which the length thereof becomes longer or shorter according to a user's manipulation.

According to various embodiments of the present disclosure, the movement of the pen may include a change in the angle of the pen or the movement of the pen point of the pen in a state in which a part of the pen is fixed.

According to various embodiments of the present disclosure, an accessory may have the shape of a case for protecting an electronic device, and may include a structure for electrical connection to the electronic device or a structure for mounting a pen. For example, the accessory may have a structure for physically securing a part (e.g., pen point) of the pen, or may have a magnetic material for bringing a part of the pen into contact with one surface of the accessory by a magnetic property.

According to various embodiments of the present disclosure, a case may be implemented as a keypad cover that includes a physical keyboard, and may include at least one mechanically operated switch member to generate an input signal when a user presses the switch member (e.g., enters a key input).

FIG. 1A is a perspective view of a case coupled to an electronic device, according to an embodiment of the present disclosure.

Referring to FIG. 1A, a case 100, a pen 101, and an electronic device 102 are provided.

The case 100 includes a pen insertion member 110, a character key area 141, and a function key area 142.

According to an embodiment of the present disclosure, the case 100 may be configured as a keypad cover that includes a physical keyboard, and may include a circuit board 150, a conductive layer 160, a plurality of dome switches 170, and conductive pads 180. When the conductive pads of the case 100 are adjacent to a touch screen 11 of the electronic device 102, the electronic device 102 may identify signals that are generated due to the adjacency of the conductive pads to the touch screen 11, thereby determining that the case 100 has been mounted on the electronic device.

According to an embodiment of the present disclosure, the case 100 is coupled to the lower end portion of the electronic device 102 to cover a part of the touch screen 11. The electronic device 102 determines an area of the touch screen 11 that is not covered with the case 100 through the signals generated by the conductive pads of the case 100, and controls to output reduced data or at least a part of data through the determined area.

The pen insertion member 110 is a member for fixing the pen 101. When the pen is inserted into the pen insertion member 110 and the angle of the inserted pen 101 changes while a part thereof is fixed, various types of data may be output from the electronic device 102. The pen insertion member 110 includes a home member for fixing a part (e.g., pen point) of the pen 101. When a user manipulates the pen 101, a part of which is inserted into the home member, the angle of the pen 101 may be changed while the inserted part of the pen 101 is fixed.

According to an embodiment of the present disclosure, the pen 101 generates an electrical signal, and the electronic device 102 detects the electrical signal to determine the location of the pen 101 and the height of the pen 101 from the electronic device 101.

The character key area 141 includes one or more physical keys for entering characters. For example, when at least one key is selected in the character key area 141, a character may be entered into the electronic device 102, or a preset operation may be performed in the electronic device 102.

The function key area 142 includes one or more physical keys for performing preset functions. For example, when at least one key is selected in the function key area 142, various functions, such as displaying a home screen, displaying the preceding screen, or cancelling an execution, may be performed in the electronic device 102.

Figure 1B:
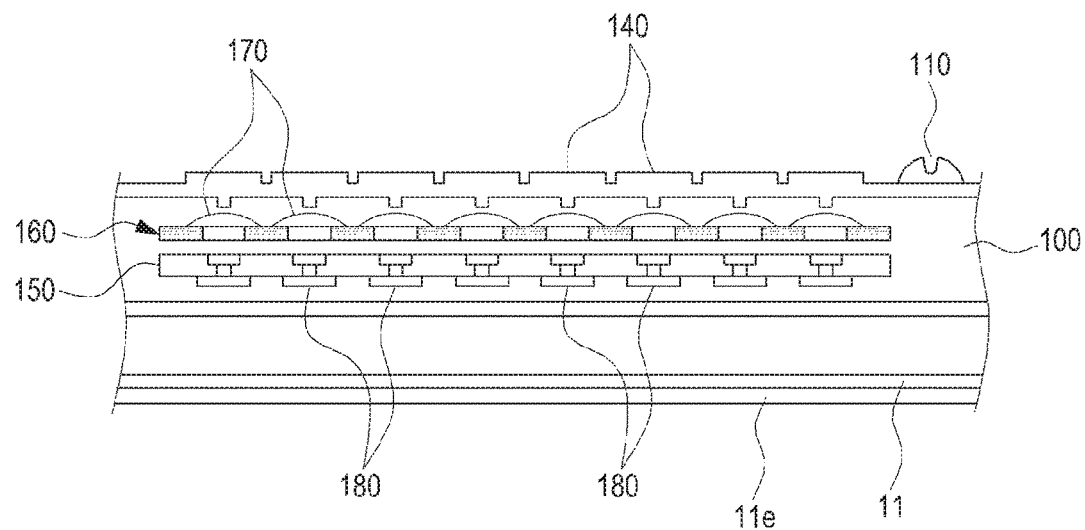
FIG. 1B is a sectional view of a case, according to an embodiment of the present disclosure.

FIG. 1B is a sectional view of a case, according to an embodiment of the present disclosure.

Referring to FIG. 1B, the case 100 includes the pen insertion member 110, switch members 140, the circuit board 150, the conductive layer 160, the plurality of dome switches 170, and the conductive pads 180.

The pen insertion member 110 is a member for fixing the pen 101. For example, when the pen 101 is inserted into the pen insertion member 110, the inserted pen 101 may be fixed to be located at a predetermined height from a touch panel 11e of the touch screen 11.

The circuit board 150 is provided in the interior of the case 100 configured as a keypad cover, and may have via holes formed through the top and bottom thereof. The via holes may be filled with a conductive material, and the top and bottom of the circuit board 150, for example, the conductive pads 180, may be electrically connected to the conductive layer 160 through the via holes and the dome switches 170.

The conductive layer 160 is formed on a surface of the circuit board 150, for example, on the top thereof. The conductive layer 160 may be formed by depositing, or plating, a conductive material onto the circuit board 150 and then partially removing (e.g., wet-etching or dry-etching) the conductive material according to a designed pattern.

The plurality of dome switches 170 are arranged on the conductive layer 160 to correspond to the respective switch members 140 (e.g., the character key area 141 or the function key area 142), thereby covering the upper sides of the via holes. When a user presses one of the switch members 140, the dome switch 170 corresponding to the pressed switch member connects a corresponding one of the conductive pads 180 to the conductive layer 160.

The conductive pads 180 may be arranged on the bottom of the circuit board 150 to correspond to a respective one of the plurality of dome switches 170 and may be electrically connected to the plurality of dome switches 170 when the plurality of dome switches 170 are pressed. For example, one of the conductive pads 180 that corresponds to one of the plurality of dome switches 170 operated by the press of the switch members 140 may be electrically connected to the conductive layer 160 via the corresponding via hole and a corresponding one of the plurality of dome switch 170.

According to an embodiment of the present disclosure, the electromagnetic properties (e.g., capacitance) of the conductive pads 180 may vary depending on whether the conductive pads 180 and the conductive layer 160 are electrically connected to each other. For example, the conductive pads 180 may be adjacent to, or make contact with, the touch screen 11. The touch screen 11 includes the touch panel 11e for detecting an electromagnetic change of the conductive pads 180 and recognizes the change of the electromagnetic properties of the conductive pads 180 as input signals.

According to an embodiment of the present disclosure, the touch panel 11e recognizes the movement of the pen 101 by detecting an electrical signal that is generated from the pen 101 inserted into the pen insertion member 110.

According to an embodiment of the present disclosure, virtual keys corresponding to the switch members 140 of the case 100 may be implemented on a portion of the touch screen 11 that is hidden by the case 100. The conductive pads 180 are disposed above the virtual keys so that the virtual keys can receive input signals according to the electrical change of the conductive pads 180. Functions corresponding to the meanings of the characters, numbers, etc. that are printed on the switch members 140 of the case 100 may be allocated to the virtual keys that are implemented on the portion hidden by the case 100.

According to an embodiment of the present disclosure, an accessory detachably coupled to an electronic device includes a body part located on at least one surface of the electronic device when the accessory is attached to the electronic device; an opening into which a part of a pen is inserted; a depression into which a pen point of the pen is inserted; and a pen accommodation part that includes a lateral portion located between the opening and the depression and a cavity located below the lateral portion to allow the pen to move, where the body part is formed of a magnetic material so as to be attached to and detached from the electronic device, and the cavity contains a conductive material through which a signal generated from the pen inserted into the depression is transferred to a touch panel of the electronic device.

According to an embodiment of the present disclosure, the accessory detachably coupled to the electronic device may include a keypad that includes one or more physical buttons, and may have a feature where the pen accommodation part is located on at least one surface of the keypad, and may be configured such that the pen accommodation part is located at a preset distance from the touch panel when the accessory is mounted on the electronic device.

According to an embodiment of the present disclosure, the accessory detachably coupled to the electronic device may be configured such that a signal generated from the pen is transferred to the touch panel of the electronic device, when the pen is inserted through the pen accommodation part.

According to an embodiment of the present disclosure, the accessory detachably coupled to the electronic device includes a pivot structure between the center of the accessory and the pen accommodation part, and an angle or moving direction of the pen may change according to an angle or rotational direction of the pivot structure, when the pen is inserted through the pen accommodation part.

According to an embodiment of the present disclosure, in the accessory detachably coupled to the electronic device, a signal generated through the magnetic material of the body part may be transferred to the electronic device when the accessory is attached to the electronic device.

Figure 2:
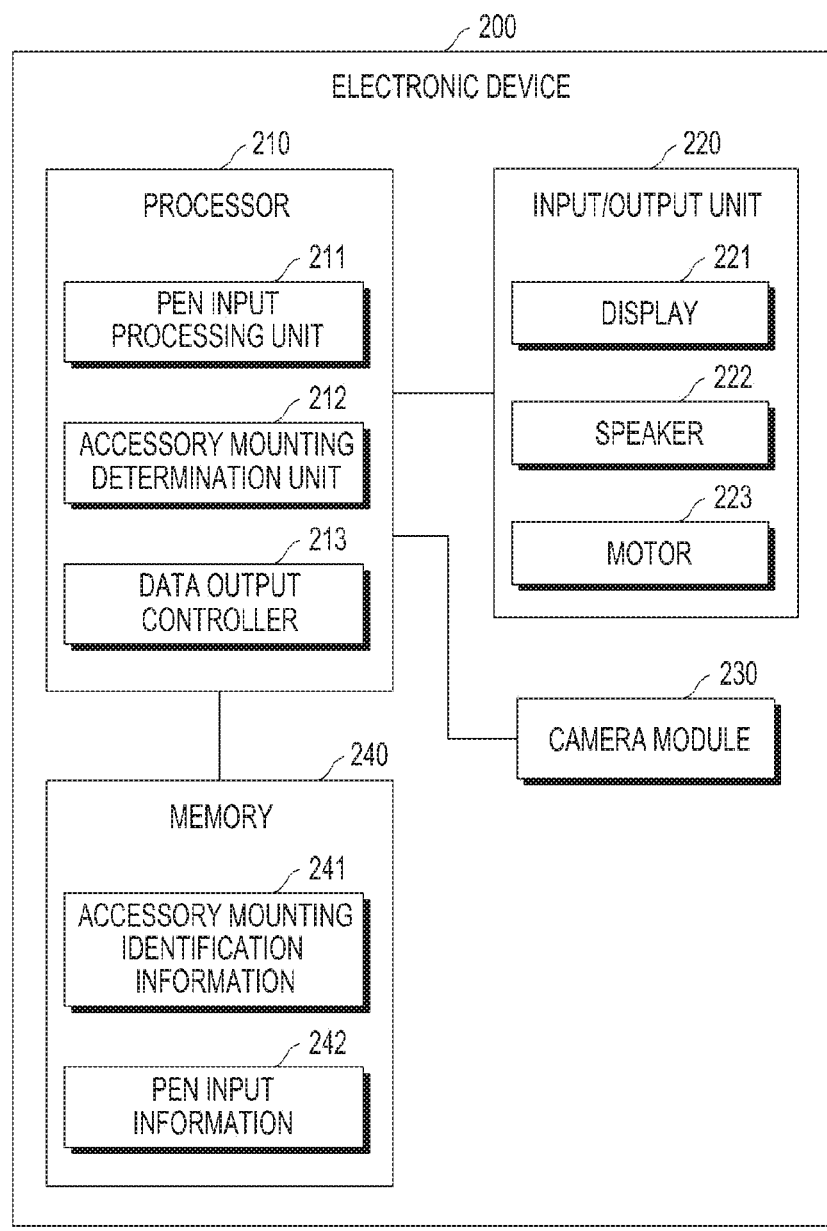
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 200 is provided. The electronic device 200 includes a processor 210, an input/output unit 220, a camera module 230, and a memory 240.

The processor 210 includes a pen input processing unit 211, an accessory mounting determination unit 212, and a data output controller 213. In addition to that, the processor 210 may include various configurations for identifying a pen input entered through an accessory and outputting data corresponding to the pen input.

The pen input processing unit 211 detects an electrical signal (e.g., an electromagnetic signal) generated from a pen 101 and converts the electrical signal into information that can be processed by the electronic device 200.

According to an embodiment of the present disclosure, the pen input processing unit 211 determines the movement and location of the pen 101 and the height of the pen 101 from a display 221 by detecting the electrical signal. For example, the pen input processing unit 211 identifies the detected electrical signal value (e.g., 20 mA) and determines information (e.g., 5 mm) corresponding to the identified electrical signal value to be the height of the pen 101.

According to an embodiment of the present disclosure, the pen input processing unit 211 measures the location or angle of the pen 101 by detecting the electrical signal and identifies weighting value information corresponding to the angle. For example, the pen input processing unit 211 determines the movement information of the pen 101 in consideration of the identified weighting value information.

The accessory mounting determination unit 212 determines whether an accessory has been mounted on the electronic device 200. For example, the accessory mounting determination unit 212, when detecting a signal (e.g., an electromagnetic signal or a magnetic signal through a short-range communication protocol (e.g., Near Field Communication (NFC), Wi-Fi, Bluetooth (BT), BT Low Energy (BLE), etc.)) that is generated from the accessory, determines that the accessory corresponding to the detected signal has been mounted on the electronic device 2011.

According to an embodiment of the present disclosure, the accessory may contain a material (e.g., a magnetic material) that generates a signal, and the electronic device 200 includes sensors (e.g., Hall sensors) for detecting various signals generated from the material.

The data output controller 213 identifies the information converted by the pen input processing unit 211 and outputs various data corresponding to the information. For example, the output data may include image data to be output through the display 221, voice data to be output through a speaker 222, vibration data to be output through a motor 223, etc. In addition, the output data may include various types of data to be output through various other configurations.

According to an embodiment of the present disclosure, based on the movement of the pen 101, the data output controller 213 controls to output various data according to applications that are being executed in the electronic device 200. For example, the output data may include data for commanding the performance of various operations, such as selecting, executing, moving, etc. at least one item in a specific application, or data for activating a specific module or function.

For example, in cases where a game application is executed, the pen 101 may operate like a joystick so that a game character may be selected and controlled according to the movement of the pen 101. In cases where a camera application is executed, at least one function (e.g., a function of photographing an image) relating to the camera module 230 may be activated.

The input/output unit 220 includes the display 221, the speaker 222, and the motor 223. In addition, the input/output unit 220 may include other configurations for inputting or outputting various types of data.

The display 221 outputs image data. For example, the display 221 may include a touch panel 11e and may detect an input from an accessory or the pen 101, which is mounted on the electronic device 200, through the touch panel 11e. For example, the display 221 detects that at least one physical key included in the accessory is selected.

According to an embodiment of the present disclosure, a hovering function may be performed over the display 221. For example, the hovering function may be performed to detect a signal of the pen 101 that is separated a predetermined distance from the display 211 and output (e.g., display) the detected signal on the display 211.

According to an embodiment of the present disclosure, the display 221 may include touch screen 11.

The display 221 outputs, to a user, user interfaces that correspond to various services (e.g., a telephone call service, a data transmission service, a broadcasting service, and a photographing service) or various running applications.

According to an embodiment of the present disclosure, the display 221 transmits, to the pen input processing unit 211, an analog signal that corresponds to at least one touch that is input to a user interface. For example, the display 221 may receive at least one input through a user's body (e.g., fingers) or a touchable input means (e.g., a digitizer pen or a stylus pen).

According to an embodiment of the present disclosure, an input includes non-contact, and thus is not limited to contact between the touch screen 11 and a user's body or a touchable input means. The distance by which the touch screen 11 can detect non-contact may be changed according to the performance or structure of the electronic device 200. For example, the touch screen 11 may be implemented in a resistive type, a capacitive type, an Electro Magnetic Resonance (EMR) type, an infrared type, or an acoustic wave type, and may also be implemented in a combination of one or more types.

The pen input processing unit 211 converts an analog signal received from the touch screen 11 to a digital signal (e.g., X and Y coordinates) and transmits the digital signal to the data output controller 213. The data output controller 213 controls to output data through the input/output unit 220 by using the digital signal received from the pen input processing unit 211. For example, the data output controller 213 controls such that at least one object displayed on the display 221 is selected in response to a touch, or an application corresponding to a shortcut icon is executed in response to a selection of the icon.

According to an embodiment of the present disclosure, the pen input processing unit 211 controls to perform a joystick function or a remote controller function based on a signal input from the pen 101. For example, the joystick function includes a function of moving a displayed object (e.g., cursor, icon, or character). The remote controller function includes a function of detecting an external electronic device (e.g., TV) through at least one sensor (e.g., an infrared sensor) included in the electronic device 200 and controlling an object (e.g., a channel or a menu) displayed on the detected external electronic device (e.g., changing or selecting a channel).

The speaker 222 outputs voice data. For example, the voice data includes data for informing that the pen 101 is fixed through the pen input processing unit 211 or data for informing that at least one accessory is mounted on the electronic device 200 through the accessory mounting determination unit 212.

The motor 223 outputs vibration data. For example, the vibration data includes data for informing that the pen 101 is fixed through the pen input processing unit 211 or data for informing that at least one accessory is mounted on the electronic device 200 through the accessory mounting determination unit 212.

The camera module 230 photographs an image. For example, the camera module 230 may be activated to photograph an image according to the movement of the pen 101, and a user may perform various operations, such as photographing, selecting, or editing an image by using the pen 101, the location of which is fixed.

The memory 240 may contain accessory mounting identification information 241 for detecting the mounting of an accessory or pen input information 242 for detecting the movement of the pen 101. In addition, the memory 240 may contain various pieces of information for outputting data according to the detected movement of the pen 101.

The accessory mounting identification information 241 includes information on the type or strength of a signal that corresponds to a specific accessory. For example, in cases where the specific signal is input with the stored signal type or strength, the electronic device 200 determines that the accessory corresponding to the relevant signal has been mounted on the electronic device 200.

The pen input information 242 includes information on the type or strength of a signal that may be input according to the movement, location, or angle of the pen 101. For example, in cases where the specific signal is input with the stored signal type or strength, the electronic device 200 determines the movement, location, or angle of the pen 101 that corresponds to the input signal.

According to an embodiment of the present disclosure, an electronic device having an accessory detachably coupled thereto, includes a display, a touch panel, and a processor. The accessory includes a body part that is formed of a magnetic material so as to be attached to and detached from the touch panel and a fixing member that has a cavity through which a pen moves when a pen point of the pen is inserted. The processor identifies an input of the pen through the touch panel, when the pen is detected for a predetermined period of time, or with a predetermined signal strength, and when the accessory is detected to be attached to the touch panel; sets the coordinates of the pen according to the identified input of the pen; and controls an object, which is displayed on the display, according to the movement of the pen in the set coordinates.

The electronic device having the accessory detachably coupled thereto, according to an embodiment of the present disclosure, may further include an input/output unit, wherein the processor identifies the movement of the pen in the set coordinates and controls to output data through the input/output unit, according to the identified movement of the pen through the input/output unit.

The electronic device having the accessory coupled thereto, according to an embodiment of the present disclosure, may further include a memory that stores information relating to the movement of the pen, wherein the processor identifies the information stored in the memory and determines information corresponding to the strength of a signal input from the pen to be the location of the pen.

The processor, according to an embodiment of the present disclosure, identifies an angle between the pen and the electronic device based on the location of the pen and determines the location of the pen in further consideration of a weighting value that is calculated based on the identified angle.

The processor, according to the an embodiment of the present disclosure, identifies a time during which the input of the pen is maintained or the moving speed of the pen and determines the location of the pen in further consideration of a weighting value that is calculated based on the identified duration time or moving speed.

The processor, according to the an embodiment of the present disclosure, controls to output, through the input/output unit, data for informing whether the location of the pen has been fixed for a predetermined period of time or whether the accessory has been mounted on the electronic device.

The processor, according to the an embodiment of the present disclosure, controls the object displayed on the display device to orient in a second direction, opposite to a first direction, in response to a hovering input that is entered by the pen in the first direction from a first point to a second point of the touch panel.

Figure 3:
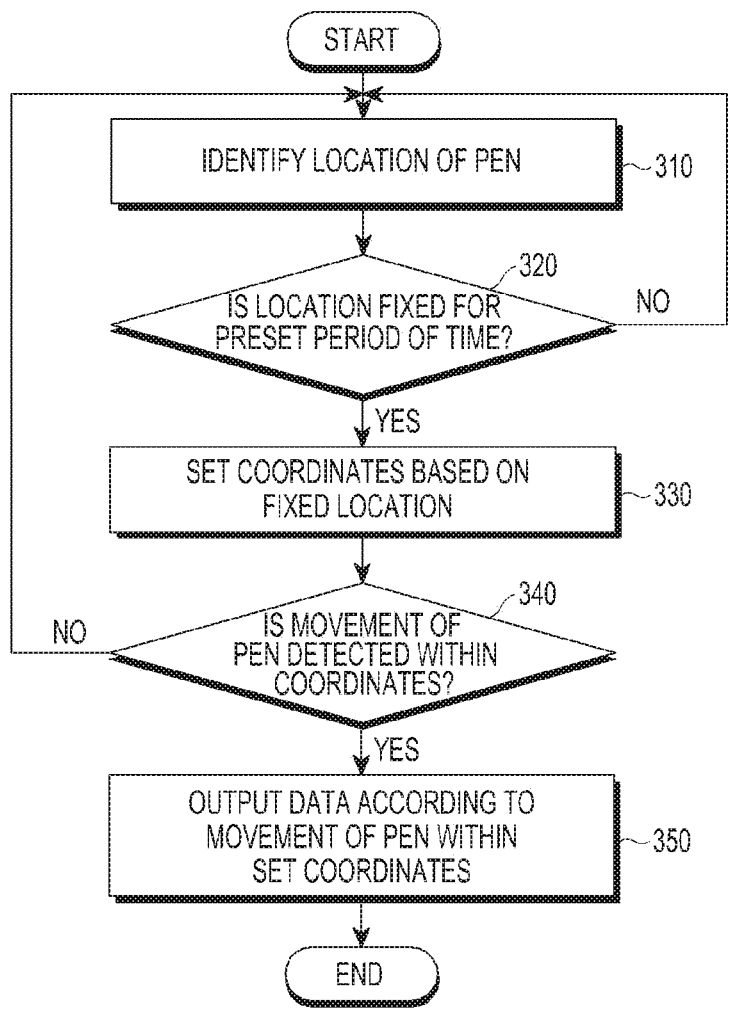
FIG. 3 is a flowchart of a method of processing a pen input by an electronic device, according to an embodiment of the present disclosure.

FIG. 3 is a flowchart of a method of processing a pen input by an electronic device, according to an embodiment of the present disclosure.

Referring to FIG. 3, the electronic device 200 identifies the location of the pen 101 in step 310. For example, the electronic device 200 measures a current level that corresponds to an input of the pen 101 and identifies the value corresponding to the relevant level to be the height of the pen 101.

According to an embodiment of the present disclosure, the electronic device 200 identifies the location of the pen 101 according to whether a preset accessory has been mounted on the electronic device. For example, in cases where a signal corresponding to pre-stored information is received, the electronic device 200 determines that the preset accessory has been mounted on the electronic device 200.

In step 320, the electronic device 200 determines whether the location of the pen 101 has been fixed for a preset period of time (e.g., whether the pen is in a stationary state for a predetermined period of time, or whether the pen moves within a threshold value (e.g., 1 mm)). When the determination in step 320 shows that the location of the pen 101 has not been fixed for the preset period of time, the electronic device 200 identifies the location of the pen 101 by performing the step 310 again.

According to an embodiment of the present disclosure, the result obtained by performing the step 320 may be output as various types of data. For example, data for informing that the location of the pen 101 has been fixed, data for informing that the location of the pen 101 is being measured, or data for informing that the location of the pen 101 has not been fixed may be output in various forms, such as a voice, an image, a vibration, etc.

According to an embodiment of the present disclosure, the electronic device 200 detects a signal generated through the pen point of the pen 101 and identifies information on the height or location of the pen 101 that is stored to correspond to the strength of the detected signal. For example, the strength of a signal detected by the electronic device 200 is measured according to the distance or angle between the pen 101 and the electronic device 200.

When the determination in step 320 shows that the location of the pen 101 has been fixed for the preset period of time, the electronic device 200 sets coordinates on the basis of the location value, which has been fixed for the preset period of time, in step 330. For example, the electronic device 200 sets coordinates with the fixed location value as a zero point.

According to an embodiment of the present disclosure, the electronic device 200 controls to display the set coordinates through the display 221 thereof. For example, lines representing the set coordinates and the movement of the pen 101 on the coordinates are output in at least a partial area of the display 221.

In step 340, the electronic device 200 determines whether the movement of the pen 101 is detected in the set coordinates. For example, in cases where the movement of the pen 101 is detected outside the set coordinates, the electronic device 200 determines that the location of the pen 101 has not been fixed and performs the step of identifying the location of the pen again in step 310.

When the determination result in step 340 shows that the movement of the pen is detected in the set coordinates, the electronic device 200 outputs data according to the movement of the pen in the set coordinates in step 350.

According to an embodiment of the present disclosure, a method of processing a pen input in an electronic device includes detecting a signal generated from a pen mounted on a fixing member when the signal is generated from the pen for informing that the pen is mounted on the fixing member is received through a touch panel of the electronic device; calculating the angle between the pen and the touch panel of the electronic device by identifying the location of the pen that corresponds to the strength of an input of the pen when the input of the pen is received with a predetermined strength for a predetermined period of time; and controlling an object displayed through the electronic device based on the calculated angle.

According to an embodiment of the present disclosure, the method of processing the pen input in the electronic device may further include identifying a movement of the pen in set coordinates; and outputting data according to the identified movement of the pen.

According to an embodiment of the present disclosure, the method of processing the pen input in the electronic device may further include identifying information stored in relation to the movement of the pen; and determining information corresponding to the strength of the signal input from the pen to be the location of the pen based on the stored information.

According to an embodiment of the present disclosure, the method of processing the pen input in the electronic device may further include identifying the angle between the pen and the electronic device based on the location of the pen; and determining the location of the pen in further consideration of a weighting value that is calculated based on the identified angle.

According to an embodiment of the present disclosure, the method of processing the pen input in the electronic device may further include identifying a time during which the input of the pen is maintained or the moving speed of the pen; and determining the location of the pen in further consideration of a weighting value that is calculated based on the identified duration time or moving speed.

According to an embodiment of the present disclosure, the method of processing the pen input in the electronic device may further include outputting data for informing whether the location of the pen has been fixed for a predetermined period of time, or whether an accessory has been mounted on the electronic device.

According to an embodiment of the present disclosure, the method of processing the pen input in the electronic device may further include controlling the displayed object to orient in a second direction opposite to a first direction in response to a hovering input that is entered by the pen in the first direction from a first point to a second point of the touch panel.

Figure 4:
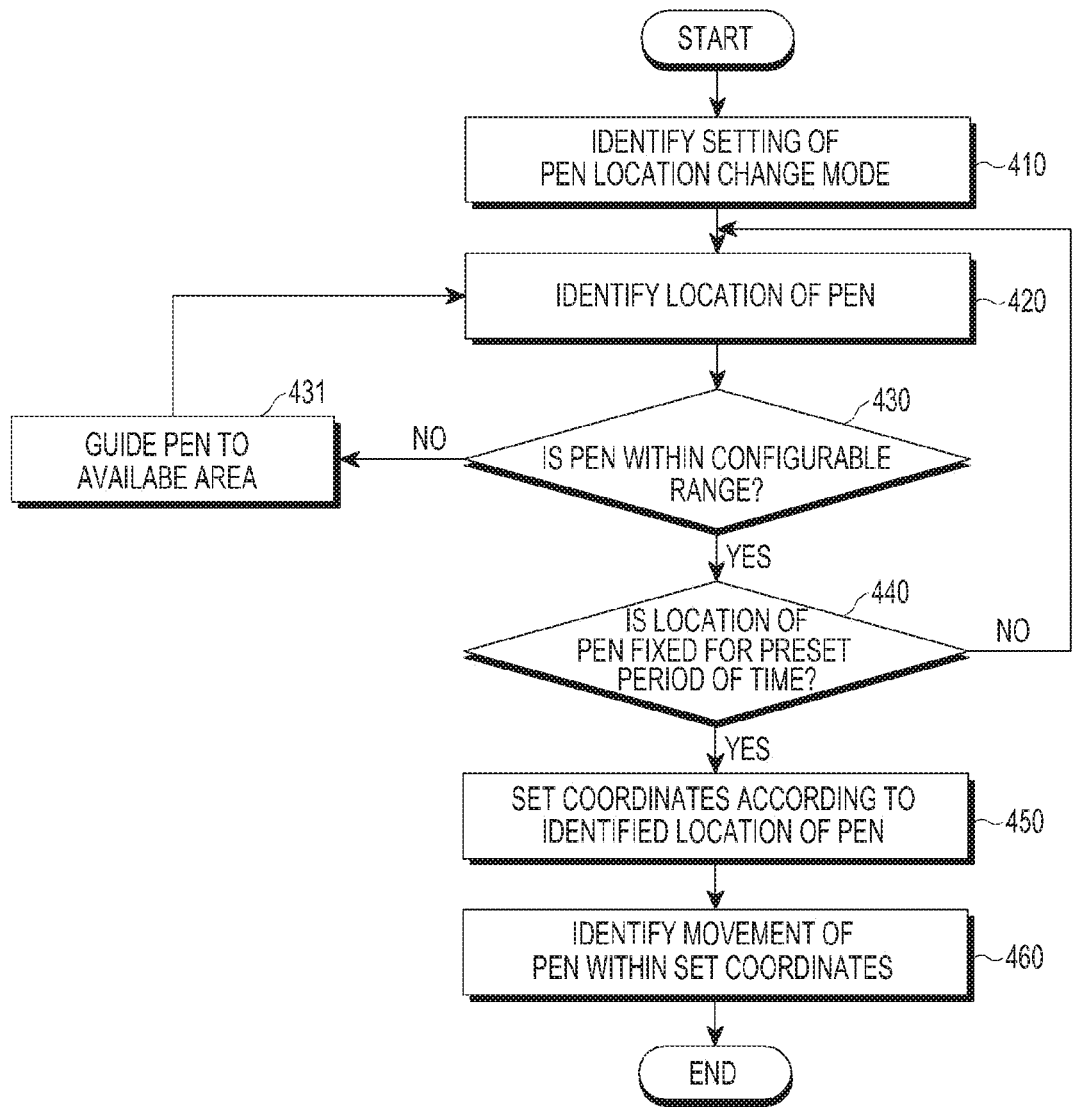
FIG. 4 is a flowchart of a method of changing coordinates that are set according to a movement of a pen, according to an embodiment of the present disclosure.

FIG. 4 is a flowchart of a method of changing coordinates that are set according to a movement of a pen, according to an embodiment of the present disclosure.

Referring to FIG. 4, in step 410, the electronic device 200 identifies whether a pen location change function has been set. For example, the pen location change function may be performed to change the fixed location of the pen 101 when a preset button is selected, or when a preset user input is detected.

In step 420, the electronic device 200 identifies the location of the pen 101. For example, the identified location of the pen 101 includes coordinates of the location where the movement of the pen 101 has been fixed for a preset period of time.

In step 430, the electronic device 200 determines whether the identified location of the pen 101 is within a configurable range. For example, the electronic device 200 determines whether the location of the pen is fixed within a range for detecting the movement of the pen 101. The range includes a pen-insertion member surrounding area for fixing the pen 101 in an accessory mounted on the electronic device 200.

According to an embodiment of the present disclosure, the electronic device 200 stores the pen-insertion member surrounding area information for the mounted accessory (e.g., location coordinates of the area where the location of the pen 101 is fixed in the mounted accessory). For example, in cases where the electronic device 200 identifies that an accessory, for which pen-insertion member surrounding area information has been stored, is mounted thereon, the electronic device 200 sets the pen-insertion member surrounding area stored for the corresponding accessory as a range for detecting the movement of the pen 101.

According to an embodiment of the present disclosure, in cases where an accessory, for which pen-insertion member surrounding area information has not been stored, is mounted on the electronic device 200, the electronic device 200 identifies whether a pen input is detected at a fixed location for a predetermined period of time and stores the identified location of the pen input as the pen-insertion member surrounding area information.

When the determination result in step 430 shows that the identified location of the pen 101 is beyond the configurable range, the electronic device 200 induces a user to set the location of the pen 101 in an available area in step 431. For example, the electronic device 200 outputs image data in the pen-insertion member surrounding area in order to induce the user to set the location of the pen 101 again in the pen-insertion member surrounding area.

According to an embodiment of the present disclosure, the location of the pen 101 may change as the location of an accessory mounted on the electronic device 200 changes. For example, in cases where a clip or pivot type of accessory is mounted on the electronic device 200, the location of the corresponding accessory may be changed according to a user's manipulation, and the electronic device 200 outputs guidance information for notifying that the accessory, the location of which has been changed, has moved from the previously set location.

When the determination in step 430 shows that the identified location of the pen 101 is within the configurable range, the electronic device 200 determines whether the identified location of the pen 101 has been fixed for a preset period of time in step 440.

When the determination in step 440 shows that the identified location of the pen 101 has not been fixed for the preset period of time, the electronic device 200 performs the step 420 again to identify the location of the pen 101.

When the determination in step 440 shows that the identified location of the pen 101 has been fixed for the preset period of time, the electronic device 200 sets coordinates according to the identified location of the pen 101 in step 450. For example, the electronic device 200 sets coordinates that have the coordinates of the identified location of the pen 101 as a zero point.

In step 460, the electronic device 200 identifies the movement of the pen 101 in the set coordinates. For example, the electronic device 200 outputs various types of data based on the identified movement of the pen 101.

Figure 5A:
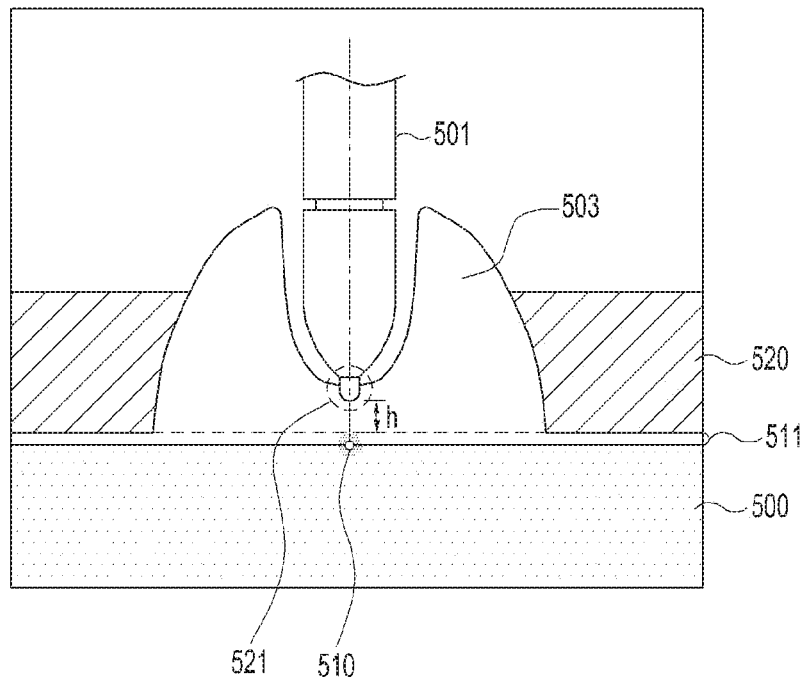
FIGS. 5A and 5B are sectional views of a pen inserted into an insertion member, according to an embodiment of the present disclosure.
Figure 5B:
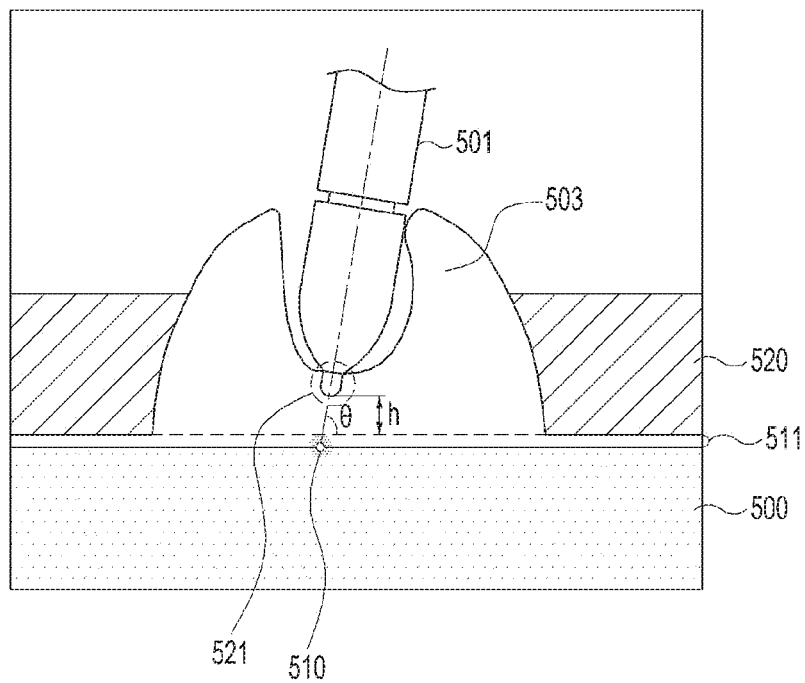

FIGS. 5A and 5B are sectional views of a pen inserted into an insertion member, according to an embodiment of the present disclosure.

Referring to FIGS. 5A and 5B, an electronic device 500 having an accessory 520 (e.g., a case, a keypad cover, or a clip type pen insertion member) mounted thereon for fixing a pen 501 is shown. For example, the electronic device 500 determines that the accessory 520 has been mounted thereon, based on a signal (e.g., short-range communication data) that is generated when a conductive pad included in the accessory 520 and a touch screen 511 of the electronic device 500 are adjacent to each other.

According to an embodiment of the present disclosure, the accessory 520 includes a pen insertion member 503. For example, the pen insertion member 503 may have a through-hole 521 formed therein into which the pen point of the pen 501 is inserted. When the pen point of the pen 501 is inserted into the through-hole 521, the pen 501 may be fixed to be perpendicular to the touch screen 511 without a user's manipulation, as shown in FIG. 5A, or the angle of the pen 501 may be changed according to the user's manipulation while the point of the pen 501 inserted into the through-hole 521 is fixed, as shown in FIG. 5B.

According to an embodiment, based on the movement of the pen 501 fixed to the accessory 520, a hovering function may be performed over the touch screen 511 of the electronic device 500. For the hovering function, the pen 501 generates a predetermined signal, and the electronic device 500 detects the generated signal so that data can be output based on the movement of the pen 501 even in a state in which the pen 501 is separated from the electronic device 500.

Referring to FIG. 5A, the pen 501 is fixed to be perpendicular to the touch screen 511.

According to various embodiments of the present disclosure, when the pen 501 is maintained for a predetermined period of time while being fixed to be perpendicular to the touch screen 511, the electronic device 500 identifies the coordinates of the location 510 where the pen 501 is fixed. For example, the electronic device 500 detects a signal generated by the pen 501 and controls to output the location 510 of the pen 501 on the display.

According to an embodiment of the present disclosure, the electronic device 500 identifies the strength of the signal generated by the pen 501 to calculate the height h between the pen 501 and the touch screen 511.

Referring to FIG. 5B, the pen 501 is fixed to be inclined with respect to the touch screen 511. For example, the pen 501 may be fixed to be inclined at an angle of 90 degrees or less with respect to the touch screen 511.

According to an embodiment of the present disclosure, the electronic device 500 identifies the angle θ between the pen 501 and the touch screen 511. For example, the electronic device 500 identifies signal information generated by the pen 501 and calculates the angle θ based on the signal strength corresponding to the relevant signal information, which has been measured for a predetermined period of time. Furthermore, when the previously identified coordinates of the location 510 of the pen 501 or the height h when the pen 501 is perpendicular to the touch screen 511 are stored, the electronic device 500 measures the distance between the pen 501 and the identified coordinates of the location 510 of the pen and calculates the angle θ by substituting the measured distance and the height h into a tangent function.

Figure 6:
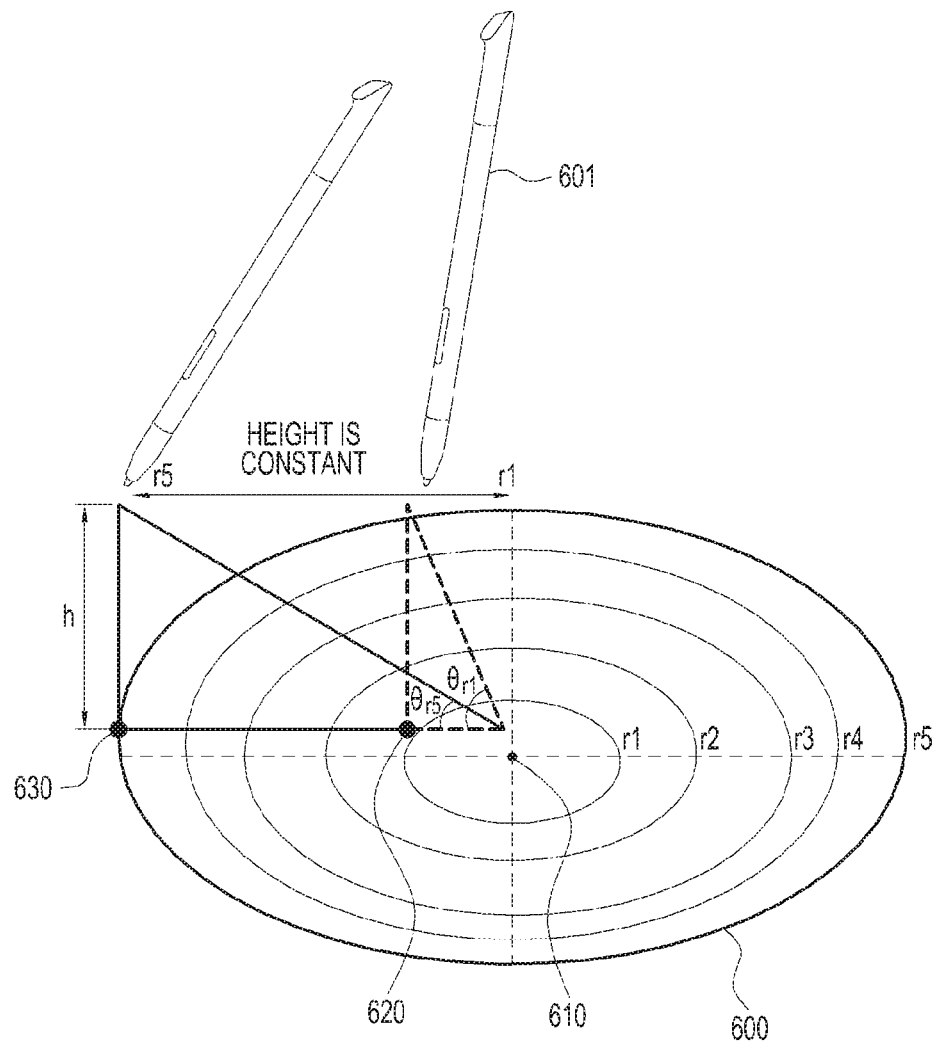
FIG. 6 illustrates a method of setting coordinates according to movement of a pen, according to an embodiment of the present disclosure.

FIG. 6 illustrates a method of setting coordinates according to movement of a pen, according to an embodiment of the present disclosure.

Referring to FIG. 6, when a pen 601 is fixed for a preset period of time, the electronic device 500 sets coordinates 600 with the location 610 where the pen 601 is fixed as a zero point. For example, the electronic device 500 detects a signal input from the pen 601 at the fixed location 610 and determines that the pen 601 is located at the height h that corresponds to the detected signal value. The electronic device 500 stores information on the height h corresponding to the signal input from the pen 601.

According to an embodiment of the present disclosure, when a user adjusts the angle θ of the pen 601, the electronic device 500 identifies the location 610 of the pen 601 that is measured in the set coordinates 600 according to the adjusted angle θ. For example, when the user adjusts the angle θ of the pen 601, the signal of the pen 601 may be determined to move away a predetermined distance r1, r2, r3, r4, or r5 from the zero point in the set coordinates 600.

According to an embodiment of the present disclosure, the electronic device 500 identifies the distance such as r1 or r5 by which the signal of the pen 501 moves away from the zero point, and identifies the tilt angle $\theta_{r1}$ or $\theta_{r5}$ of the pen by substituting the identified distance r1 or r5 and the height h into a tangent function.

Figure 7:
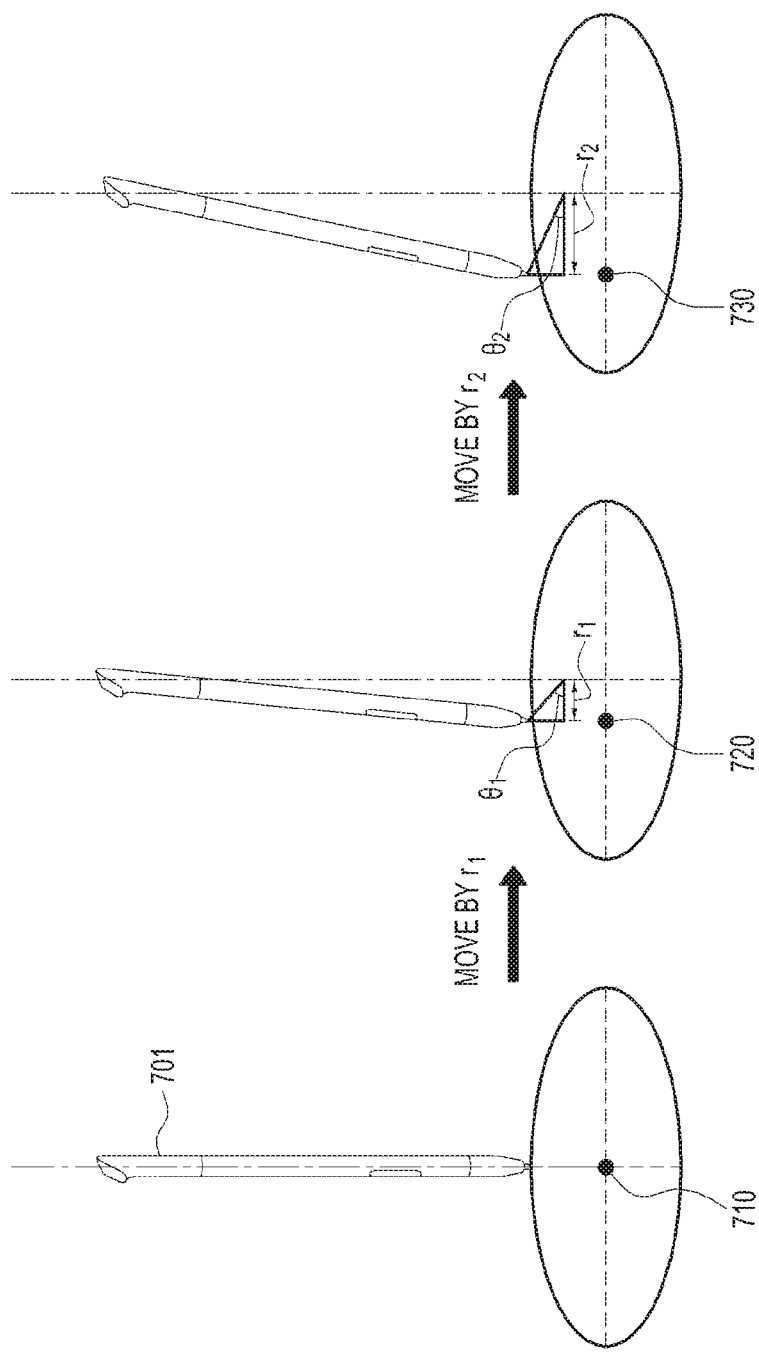
FIGS. 7 and 8 illustrate methods of correcting a movement of a pen according to a measured angle, according to various embodiments of the present disclosure.
Figure 8:
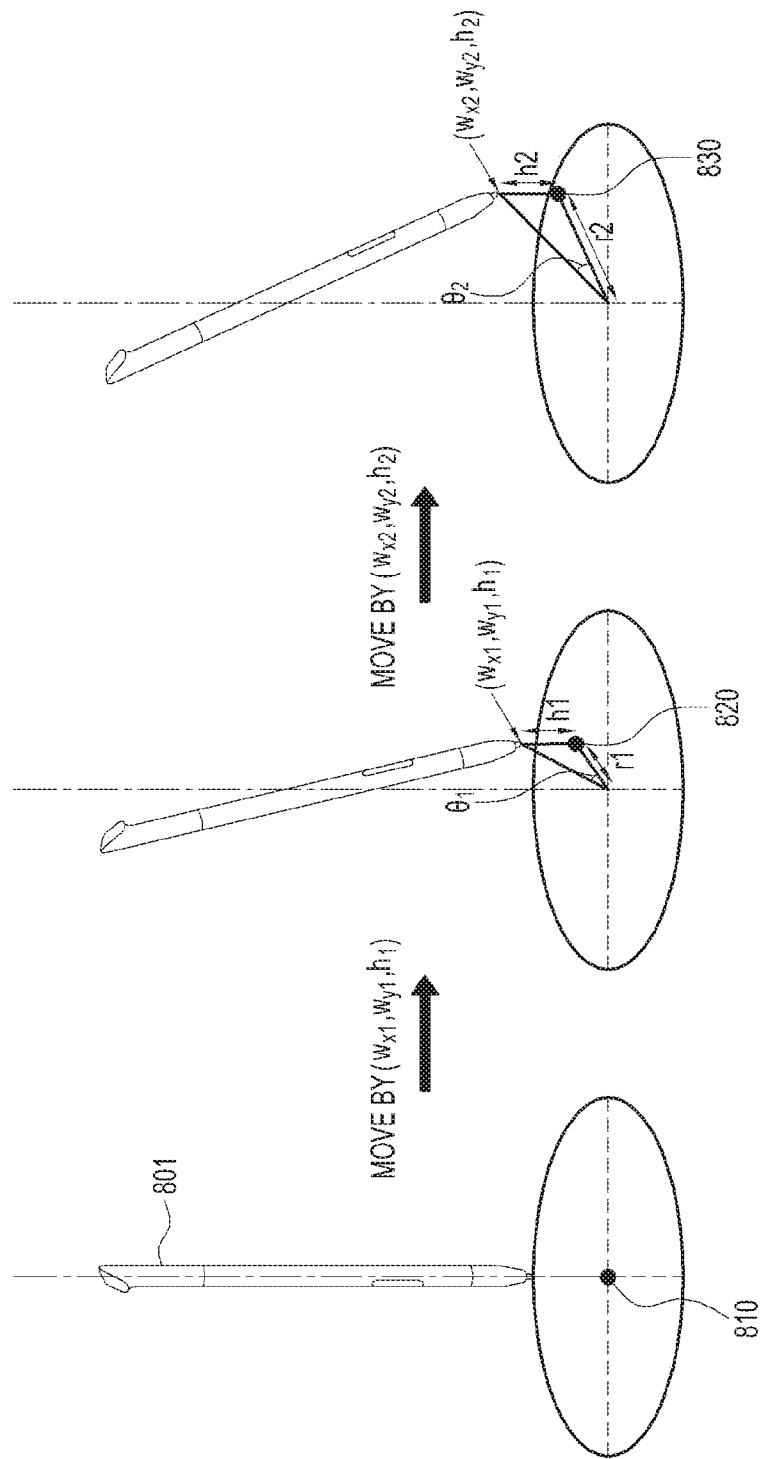

FIGS. 7 and 8 illustrate methods of correcting a movement of a pen according to a measured angle, according to various embodiments of the present disclosure.

Referring to FIG. 7, when the electronic device 500 determines that an initial location 710 of a pen 701 has been fixed for a preset period of time, the electronic device 500 sets x and y coordinates of the fixed location 710 as a zero point (0, 0).

According to an embodiment of the present disclosure, when the angle θ of the pen 701 is changed, the electronic device 500 identifies a moving distance r in the set x and y coordinates. For example, when the set x and y coordinates of the pen 701 correspond to an initial location 710, at which the pen point of the pen 701 is perpendicular to the electronic device 500, the detailed movement of the pen 701 is not reflected in the x and y coordinates since there is no change in the angle θ of the pen 701. However, when the angle θ of the pen 701 is changed to a first angle $\theta_1$ corresponding to a second location 720 of the pen 701, or to a second angle $\theta_2$ corresponding to a third location 730 of the pen 701, the detailed movement of the pen 701 is reflected in the x and y coordinates.

According to an embodiment of the present disclosure, the electronic device 500 may correct the identified moving distance value according to the measured angle θ of the pen 701. For example, the electronic device 500 identifies the angle $\theta_1$ or $\theta_2$ of the pen 701 that is calculated according to the identified moving distance $r_1$ or $r_2$, and multiplies the corresponding angle value by a weighting value $W_{r1}$ or $W_{r2}$ corresponding to the identified angle $\theta_1$ or $\theta_2$.

According to an embodiment of the present disclosure, the electronic device 500 measures the movement of the pen 701 in detail by correcting the identified angle value.

Table 1 shows an example of weighting values that are multiplied according to the distances from the zero point to the location of the pen 701, according to an embodiment of the present disclosure.

TABLE 1

| r (radius) | 0~r1 | r1~r2 | r2~r3 | r3~r4 | r4~r5 | r5~ |
|---|---|---|---|---|---|---|
| weighting value | 0 (minimum range close to stop) | 1 | 2 | 3 | 6 (fast weighting value) | 0 (beyond range) |

According to an embodiment of the present disclosure, the weighting value, without being limited to the values listed in Table 1, may be calculated as various values according to the movement of the pen 701.

Referring to FIG. 8, when the electronic device 500 determines that an initial location 810 of a pen 801 has been fixed for a preset period of time, the electronic device 500 sets x, y, and z coordinates of the fixed location 810 as a zero point (0, 0, 0).

According to an embodiment of the present disclosure, when the angle θ of the pen 801 is changed, the electronic device 500 identifies x, y, and z coordinates that correspond to a location to which the pen point of the pen 801 is perpendicular to the electronic device 500. For example, the x and y coordinates correspond to coordinates of a location 820 or 830 where an electrical signal is induced on the touch screen 511 by the pen 801, and the z coordinate corresponds to the height $h_1$ or $h_2$ of the pen 801 according to the strength of the induced electrical signal.

According to an embodiment of the present disclosure, the electronic device 500 identifies the distance $r_1$ or $r_2$ from the zero point to the identified x and y coordinates of the location 820 or 830 of the pen 801 and calculates the angle $\theta_1$ or $\theta_2$ between the zero point and the pen 801 according to the identified distance. For example, the electronic device 500 calculates the angle $\theta_1$ or $\theta_2$ by substituting the identified distance $r_1$ or $r_2$ and the height h1 or h2 into a tangent function.

According to an embodiment of the present disclosure, the electronic device 500 identifies a weighting value $W_{r1}$ or $W_{r2}$ that corresponds to the calculated angle $\theta_1$ or $\theta_2$ and corrects the angle $\theta_1$ or $\theta_2$ by multiplying the corresponding angle $\theta_1$ or $\theta_2$ by the weighting value $W_{r1}$ or $W_{r2}$. For example, the electronic device 500 corrects the angle $\theta_1$ or $\theta_2$ by adding the weighting value $W_{r1}$ or $W_{r2}$ to the calculated angle $\theta_1$ or $\theta_2$ to measure the movement of the pen 801 in detail.

According to an embodiment of the present disclosure, the electronic device 500 calculates the weighting value $W_{r1}$ or $W_{r2}$ in further consideration of the moving speed of the pen 801. For example, the electronic device determines that the pen 801 moves to an average distance when the moving speed of the pen 801 is within a preset speed range and determines that the pen 801 moves to a long distance when the moving speed of the pen exceeds a preset speed. In addition, the electronic device 500 determines that the pen moves minutely when the moving speed of the pen 801 is lower than or equal to the preset speed.

Figure 9:
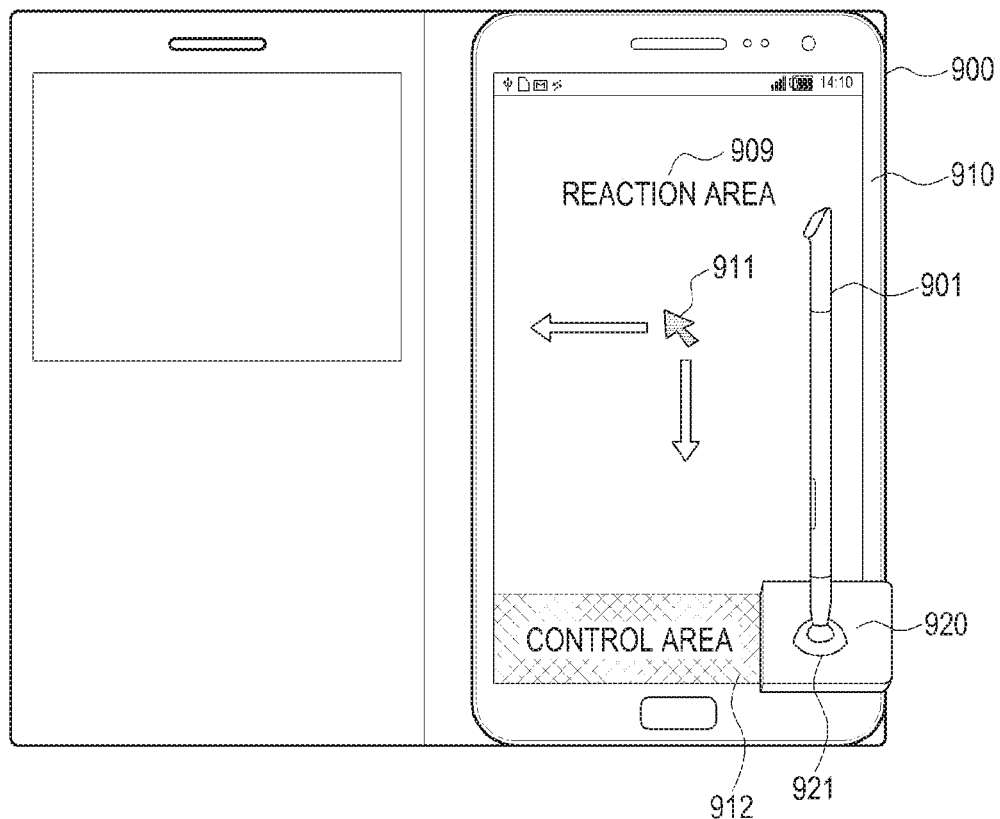
FIG. 9 illustrates a method of outputting data by an electronic device when an accessory is mounted on the electronic device, according to an embodiment of the present disclosure.

FIG. 9 illustrates a method of outputting data by an electronic device when an accessory is mounted on the electronic device, according to an embodiment of the present disclosure.

Referring to FIG. 9, an accessory 920, e.g., a case, having a pen insertion member 921, is mounted on an electronic device 900. According to an embodiment of the present disclosure, a user may insert a pen 901 into the pen insertion member 921. For example, when the location of the inserted pen 901 is fixed for a predetermined period of time, the electronic device 900 sets coordinates based on the fixed location.

According to an embodiment of the present disclosure, when the user changes the angle of the pen by manipulating the pen 901 inserted into the pen insertion member 921, the electronic device 900 outputs data corresponding to the changed angle through a display 910 of the electronic device 900. For example, the data corresponding to the changed angle includes data for moving at least one object, e.g., a cursor 911, according to the changed angle, or image data that is output in response to the movement.

According to an embodiment of the present disclosure, the display 910 includes a reaction area 909 where the data corresponding to the changed angle is output and a control area 912 on which the pen insertion member 921 is mounted and which includes a touch panel for performing a joystick function using the pen 901. For example, when a signal generated from the pen 901 is detected through a touch panel of the electronic device 900, the electronic device 900 detects the movement of the pen 901 through the detected signal.

According to an embodiment of the present disclosure, when the accessory 920 is mounted on the electronic device 900, a predetermined area around the mounted accessory 920 may be set as the control area 912. For example, the control area 912 includes virtual coordinates where the movable range of the pen 901 is set based on the location (or fixed point) where the accessory 920 is mounted.

According to an embodiment of the present disclosure, the electronic device 900 sets the display 910 on the basis of the set control area 912. For example, the electronic device 900 may deactivate data output from the control area 912, and in order to output data in the reaction area 909, the electronic device 900 may move or reduce a screen to be output and then output the corresponding screen to the reaction area 909.

Figure 10A:
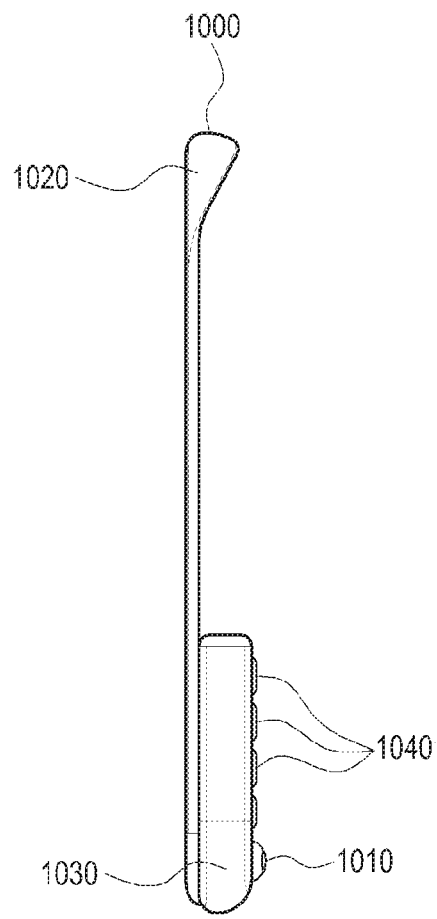
FIGS. 10A to 10C are views of a case structure of an electronic device and a keypad cover, according to an embodiment of the present disclosure.
Figure 10B:
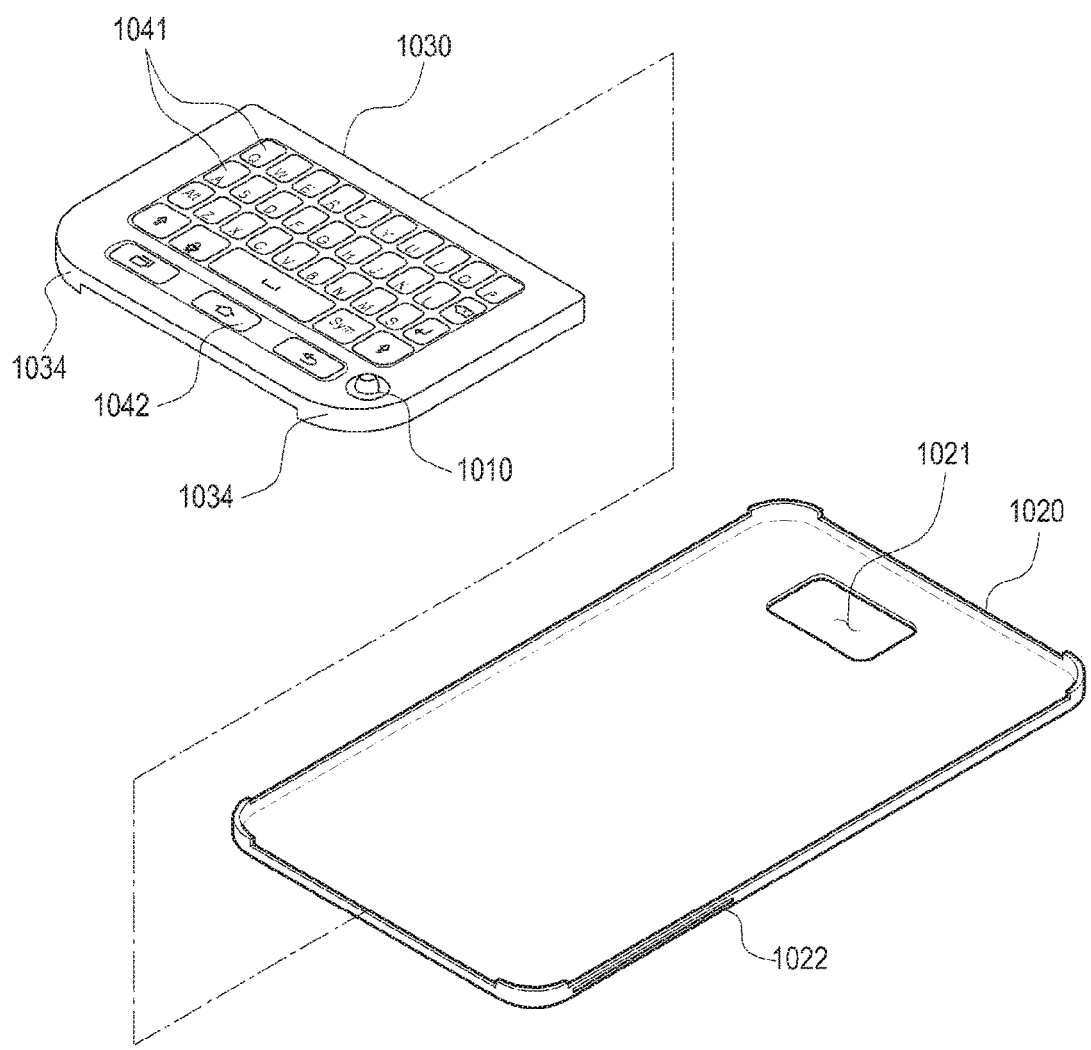
Figure 10C:
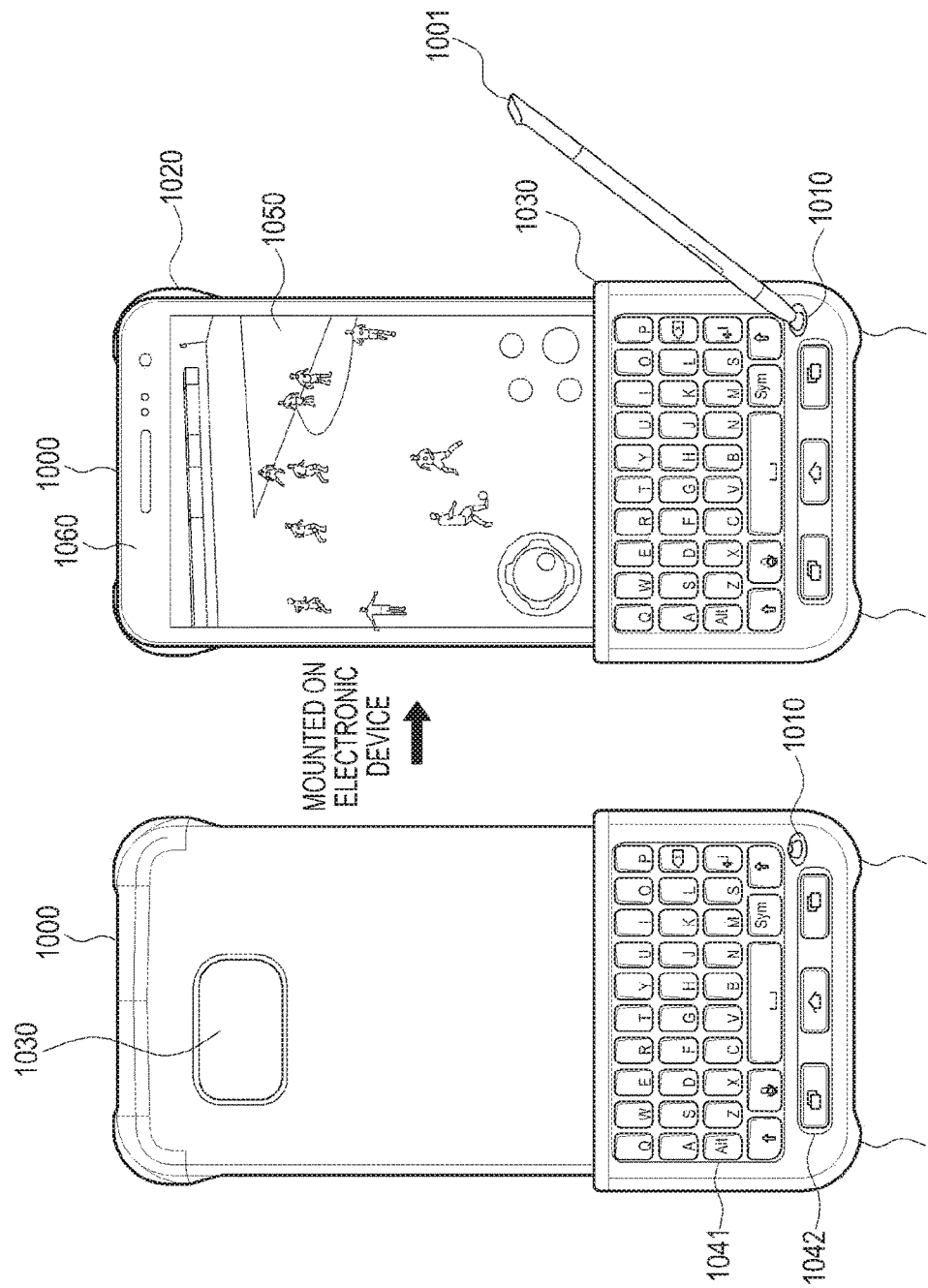

FIGS. 10A to 10C are views of a case structure of an electronic device and a keypad cover, according to an embodiment of the present disclosure.

Referring to FIG. 10A, a side view a case 1000 including a back cover 1020 and a keypad cover 1030 are shown The back cover 1020 may be mounted on the back side of the electronic device 1060, as shown in FIG. 10C, to protect the back side thereof from external shock. For example, the back cover 1020 may be formed of a synthetic resin (e.g., polyurethane, polycarbonate, etc.) and, without being limited thereto, may be formed of various materials capable of protecting the electronic device 1060.

The side of the back cover 1020 may be formed to partially surround the side of the electronic device 1060 so that the back cover 1020 may be detachably coupled to the electronic device 1060.

The keypad cover 1030 includes one or more mechanically operated switch members 1040 (e.g., character key members 1041 or function key members 1042) or a pen insertion member 1010, and generates an input signal when a user presses one button of the switch members 1040 (e.g., enters a key input) or operates the pen 1001, as shown in FIG. 10C, inserted into the pen insertion member 1010.

The switch members 1040 may perform a function of inputting a character corresponding to a button selected by the user or a specified function. In addition to that, the switch members 1040 may perform a function of inputting English, numbers, special characters, and various languages, such as Hangul, etc. The keypad cover 1030 may be formed of polycarbonate, and the switch members 1040 may be formed of a synthetic resin (e.g., polyurethane, polycarbonate, etc.).

For example, the keypad cover 1030 may be mounted on the front of the electronic device 1060 (e.g., on the lower end portion of the front of the electronic device 1060) and may be configured such that the user inputs a key or manipulates the pen 1001 while viewing a touch screen 1050, shown in FIG. 10C, of the electronic device 1060.

Referring to FIG. 10B an exploded perspective view of the keypad cover 1030 and the back cover 1020 of the case 1000 before and after a being coupled is shown.

The back cover 1020 includes coupling grooves 1022 formed on opposite lateral sides thereof. The coupling grooves 1022 are formed along the longitudinal direction of the opposite lateral sides of the back cover 1020. Opposite lateral sides of the keypad cover 1030 are formed to surround the opposite lateral sides of the back cover 1020. The back cover 1020 has an opening 1021 formed therein for exposing a camera or flash of the electronic device 1060 to the outside.

Opposite lateral ends 1034 of the keypad cover 1030 extend from the opposite lateral sides of the keypad cover 1030 and have a shape corresponding to the coupling grooves 1022. Furthermore, the opposite lateral ends 1034 of the keypad cover 1030 are formed along the longitudinal direction of the opposite lateral sides of the back cover 1020 and are coupled to the coupling grooves 1022 through a sliding motion. The opposite lateral ends 1034 of the keypad cover 1030 are engaged with the coupling grooves 1022 so that the keypad cover 1030 may be mounted to face the front of the back cover 1020. The keypad cover 1030 may slide along the coupling grooves 1022 to separate the keypad cover 1030 from the back cover 1020.

Referring to FIG. 10C a state in which the case 1000 is coupled to the electronic device 1060 is shown.

The electronic device 1060, according to an embodiment, may be coupled to the back cover 1020, and the opposite lateral ends 1034 of the keypad cover 1030 may be engaged with the coupling grooves 1032 of the back cover 1020, to which the electronic device 1000 is coupled, so that the keypad cover 1030 is mounted to face the front of the back cover 1020.

According to an embodiment of the present disclosure, due to the structure in which the keypad cover 1030 and the back cover 1020 are coupled to each other, a user may input desired information through the switch members 1040 of the keypad cover 1030 while viewing the touch screen 1050, or may move an object (e.g., a character on a game screen) by changing the angle of the pen 1001 while the pen 1001 is fixed to the pen insertion member 1010.

Figure 11:
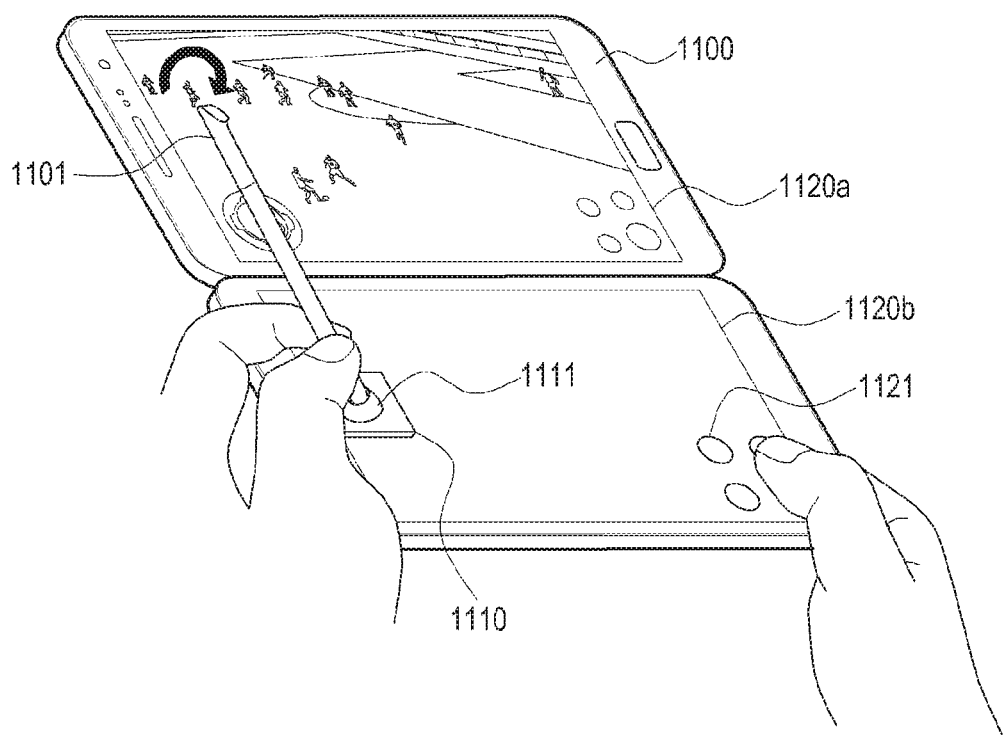
FIG. 11 illustrates an accessory for fixing a pen coupled to an electronic device having multiple screens, according to an embodiment of the present disclosure.

FIG. 11 illustrates an accessory for fixing a pen is coupled to an electronic device having multiple screens, according to an embodiment of the present disclosure.

Referring to FIG. 11, an accessory 1110 coupled to an electronic device 1100 having a dual screen with i.e., a first screen 1120a and a second screen 1120b, is shown. The dual screen may display different screens on the first screen 1120a and the second screen 1120b, or may display split screens, into which one screen is split, through the first screen 1120a and the second screen 1120b. For example, when a game application is executed in the electronic device 1100, the screen of the game application may be displayed through the first screen 1120a, and an area for operating the game application may be configured through the second screen 1120b.

According to an embodiment of the present disclosure, when the accessory 1110 is mounted on the second screen 1120b, a pen 1101 inserted into the accessory 1110 performs a joystick function, and function buttons 1121 relating to the game application are included in a partial area of the second screen 1120b. For example, the electronic device 1100 controls to activate the joystick function when identifying that the pen 1101 has been fixed at a predetermined height for a predetermined period of time or when detecting that the pen 1101 has been inserted into the accessory 1111.

Figure 12:
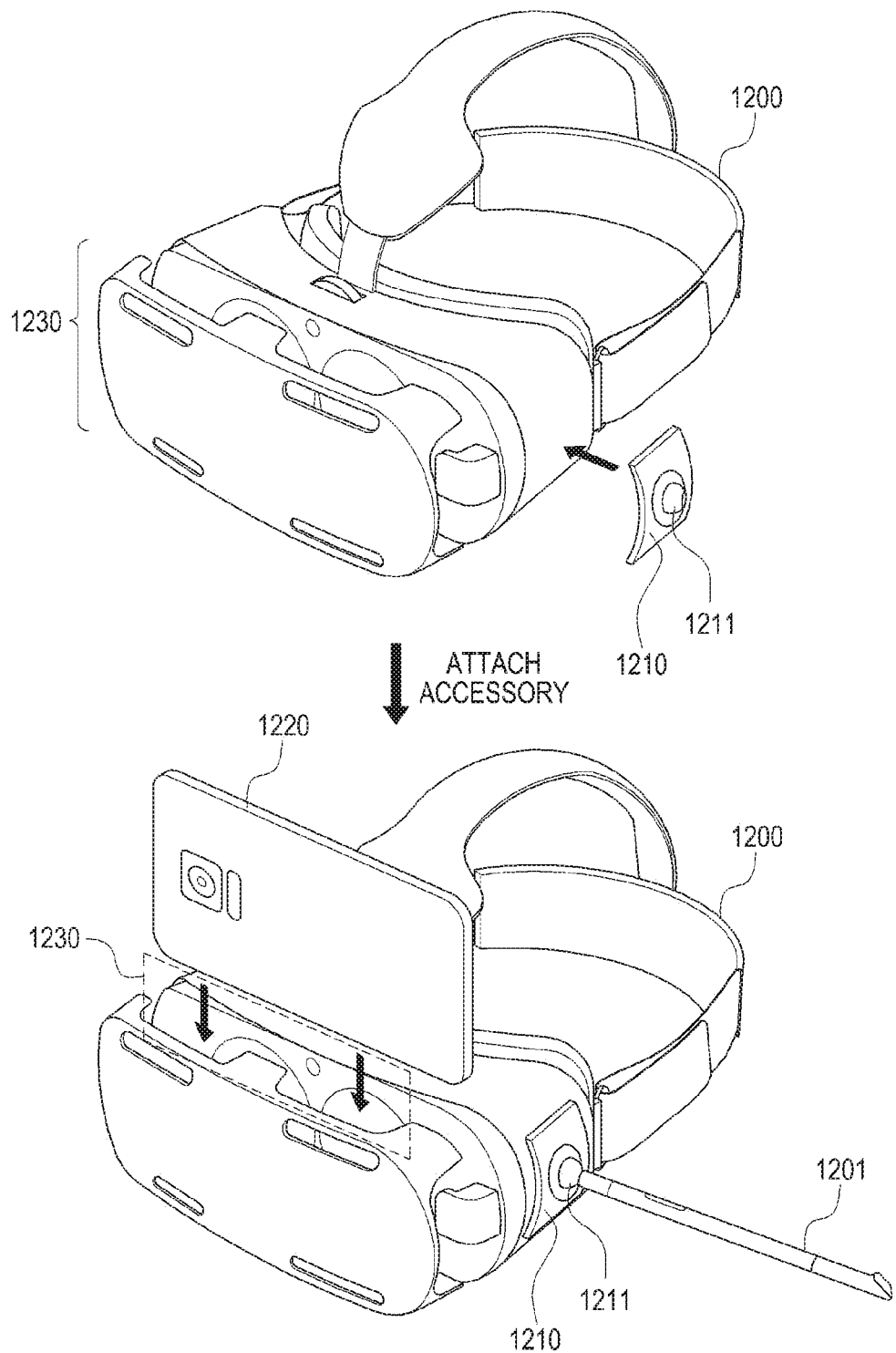
FIG. 12 illustrates an accessory for fixing a pen coupled to eyeglasses-shaped wearable electronic device, according to an embodiment of the present disclosure.

FIG. 12 illustrates an accessory for fixing a pen coupled to an eyeglasses-shaped wearable electronic device, according to an embodiment of the present disclosure.

Referring to FIG. 12, an accessory 1210 coupled to an eyeglasses-shaped wearable electronic device 1200 is shown. The accessory 1210 may contain a magnetic material and may be attached to one surface of the eyeglasses-shaped wearable electronic device 1200. For example, the accessory 1210 includes a pen insertion member 1211, and when a pen 1201 is inserted into the pen insertion member 1211, the height of the pen 1201 from the eyeglasses-shaped wearable electronic device 1200 is fixed.

According to an embodiment of the present disclosure, the electronic device 1200 may include an insertion member 1230, into which another electronic device 1220 (e.g., a smart phone) is inserted.

According to an embodiment of the present disclosure, the eyeglasses-shaped wearable electronic device 1200 includes a touch panel on at least one surface thereof, and when the accessory 1210 is attached to the surface on which the touch panel is included, the eyeglasses-shaped wearable electronic device 1200 identifies an input of the pen 1201 inserted into the accessory 1210.

According to an embodiment of the present disclosure, the accessory 1210 may be formed of a material that can be attached to and detached from the eyeglasses-shaped wearable electronic device 1200, or the pen insertion member 1211 may be manufactured so as to be inserted into the eyeglasses-shaped wearable electronic device 1200. For example, a touch panel may be included on one surface of the eyeglasses-shaped wearable electronic device 1200 to which the pen insertion member 1211 is attached.

Figure 13:
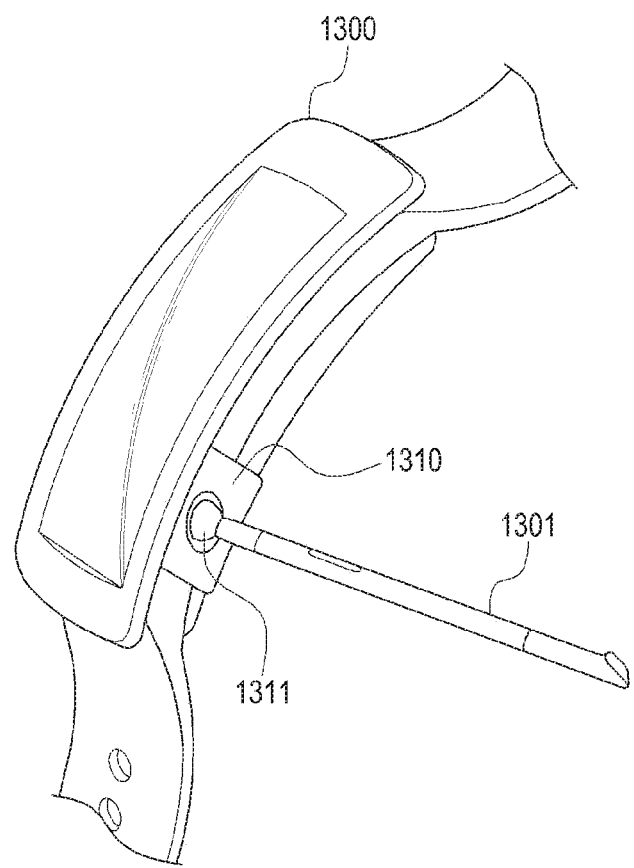
FIG. 13 illustrates an accessory for fixing a pen coupled to a wristwatch-shaped electronic device, according to an embodiment of the present disclosure.

FIG. 13 illustrates an accessory for fixing a pen coupled to an wristwatch-shaped electronic device, according to an embodiment of the present disclosure.

Referring to FIG. 13, an accessory 1310 coupled to a wristwatch-shaped electronic device 1300 is shown. The wristwatch-shaped electronic device 1300 may perform various operations in conjunction with an external electronic device (e.g., a smart phone).

According to an embodiment of the present disclosure, the wristwatch-shaped electronic device 1300 includes a touch panel on at least one surface thereof, and when the accessory 1310 is attached to the surface on which the touch panel is included, the wristwatch-shaped electronic device 1300 identifies an input of a pen 1301 inserted into the accessory 1310.

According to an embodiment of the present disclosure, the accessory 1310 may be formed of a material that can be attached to and detached from the wristwatch-shaped electronic device 1300, or a pen insertion member 1311 may be manufactured so as to be inserted into the wristwatch-shaped electronic device 1300. For example, a touch panel may be included on one surface of the wristwatch-shaped electronic device 1300 to which the pen insertion member 1311 is attached.

The accessory 1310, according to an embodiment of the present disclosure, may contain a magnetic material and may be attached to one surface of the wristwatch-shaped electronic device 1300. For example, the accessory 1310 includes the pen insertion member 1311, and when the pen 1301 is inserted into the pen insertion member 1311, the height of the pen 1301 from the wristwatch-shaped electronic device 1300 may be fixed. The wristwatch-shaped electronic device 1300 may perform an operation of controlling data thereof based on a movement (e.g., tilt) of the pen 1301.

Figure 14:
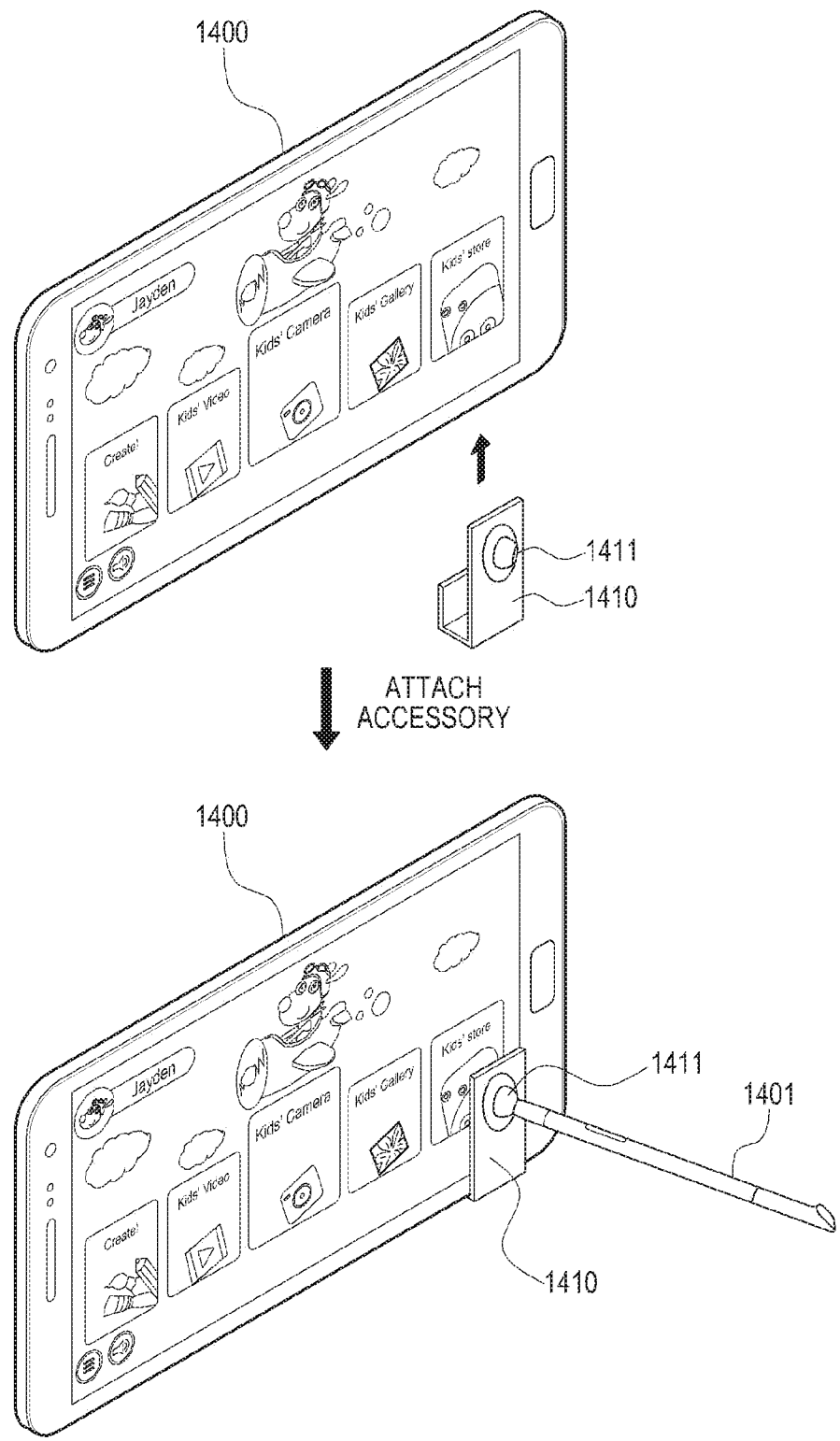
FIG. 14 illustrates an accessory for fixing a pen coupled to a smart phone or tablet electronic device, according to an embodiment of the present disclosure.

FIG. 14 illustrates an accessory for fixing a pen coupled to a smart phone electronic device, according to an embodiment of the present disclosure.

Referring to FIG. 14, an accessory 1410 coupled to a smart phone or tablet electronic device 1400 is provided. The accessory 1410 having a '⊏' shape may be coupled to the smart phone or tablet electronic device 1400 by being clamped to a part of the smart phone or tablet electronic device 1400. The accessory 1410 includes a pen insertion member 1411, and when a pen 1401 is inserted into the pen insertion member 1411, the height of the pen 1401 from the smart phone or tablet electronic device 1400 may be fixed.

According to an embodiment of the present disclosure, when it is identified that the height of the pen 1401 is fixed, the smart phone or tablet electronic device 1400 identifies an input of the pen 1401 to be a joystick input. For example, the smart phone or tablet electronic device 1400 may control at least one displayed object based on a movement of the pen 1401.

Figure 15:
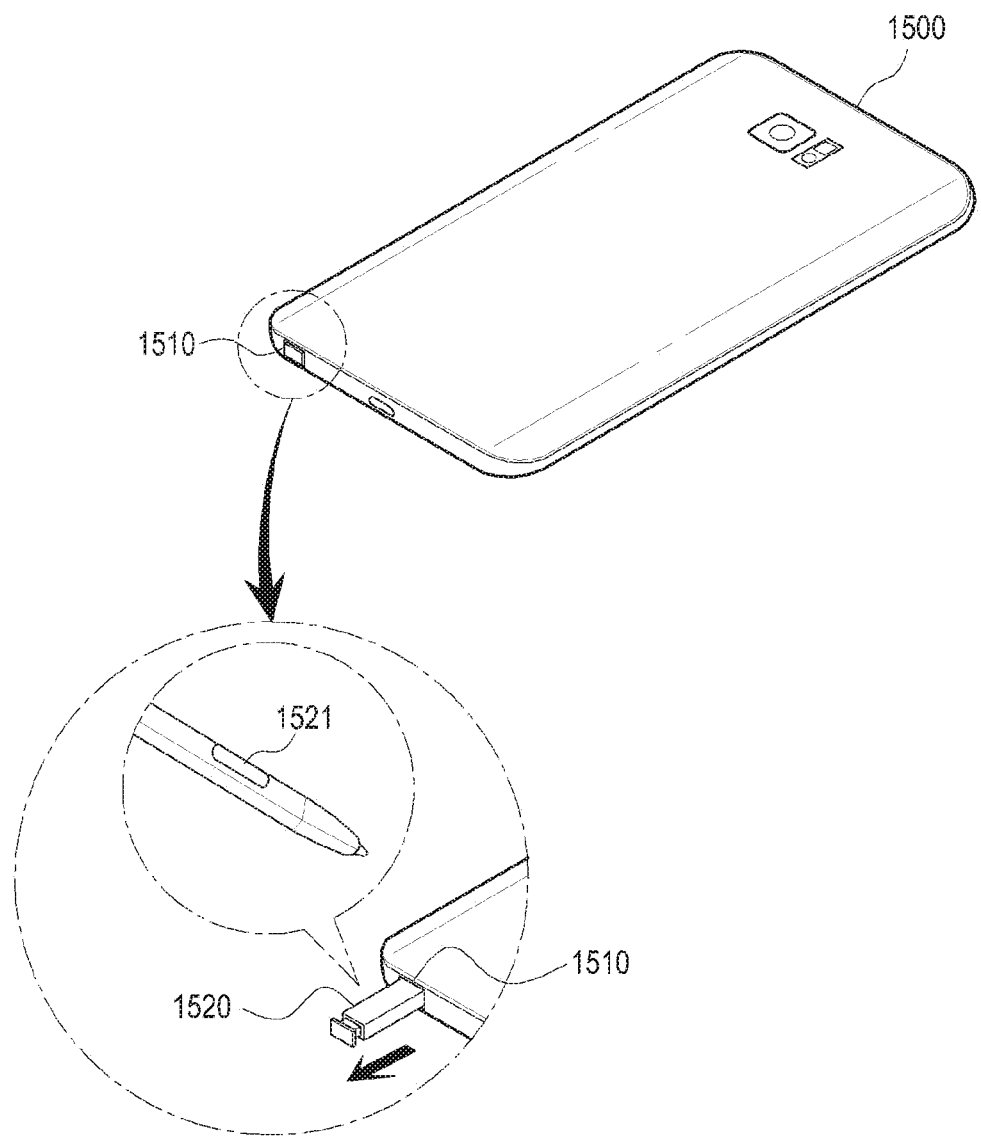
FIG. 15 is a rear perspective view of an electronic device, according to an embodiment of the present disclosure.

FIG. 15 is a rear perspective view of an electronic device, according to an embodiment of the present disclosure.

Referring to FIG. 15, an electronic device 1500 and a pen 1520 is shown. The electronic device 1500 has a pen insertion hole 1510 which is formed on the lower side thereof and into which the pen 1520 may be inserted.

The pen 1520 includes a button 1521. The electronic device 1500 detects the push of the button 1521 of the pen 1520 or a hovering input event corresponding to the push.

According to an embodiment of the present disclosure, when the button 1521 of the pen 1520 is pushed, an electromagnetic signal generated from the pen 1520 is changed, and the electronic device 1500 detects the selection of the button 1521 by detecting the changed electromagnetic signal. For example, the changed electromagnetic signal is an electromagnetic signal generated by the change of an induction magnetic field that is generated by a coil included in the pen 1520 when the button 1521 is pushed.

According to an embodiment of the present disclosure, the electronic device 1500 may include a touch panel (e.g., an EMR type panel), and may detect the push of the button 1521 by detecting the changed electromagnetic signal through the touch panel.

According to an embodiment of the present disclosure, the electronic device 1500 determines whether the button 1521 has been pushed. For example, when a first signal is detected from the pen 1520, the electronic device 1500 determines that the button 1521 has not been pushed, and when a second signal is detected, the electronic device 1500 determines that the button 1521 has been pushed.

According to an embodiment of the present disclosure, when a user pushes the button 1521 of the pen 1520, the pen 1520 stops transmitting the first signal in order to transmit the second signal.

Figure 16:
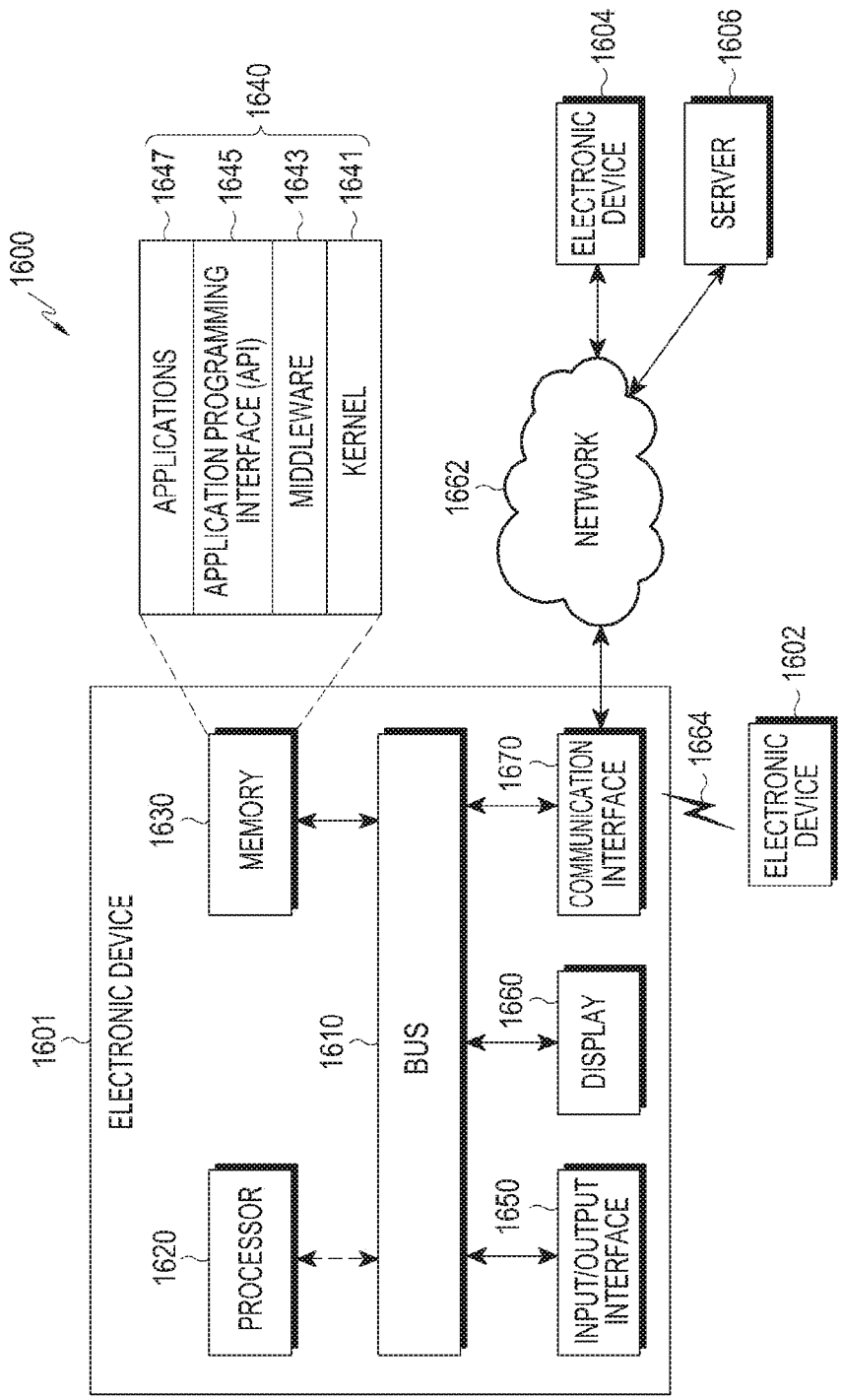
FIG. 16 is a diagram of a configuration of a network environment, according to an embodiment of the present disclosure.

FIG. 16 is a diagram illustrating an example of a network environment, according to an embodiment of the present disclosure.

Referring to FIG. 16, a network environment 1600 is provided. The network environment 1600 includes an electronic device 1601, at least one external electronic device, e.g., a first external electronic device 1602 or a second external electronic device 1604, and a server 1606. The external electronic devices may be connected to the electronic device 1601 through a network 1662, or through a communication interface 1670 of the electronic device 1601.

The electronic device 1601 includes a bus 1610, a processor 1620, a memory 1630, an input/output interface 1650, a display 1660, and the communication interface 1670. In some embodiments, the electronic device 1601 may omit at least one of the elements, or may further include other elements.

The bus 1610 may include a circuit that interconnects the elements 1610 to 1670 and transfers communication (e.g., control messages and/or data) between the elements.

The processor 1620 may include one or more of a Central Processing Unit (CPU), an Application Processor (AP), and a Communication Processor (CP). The processor 1620 carries out operations or data processing relating to control and/or communication of at least one other element of the electronic device 1601.

The memory 1630 includes a volatile memory and/or a non-volatile memory. The memory 1630 stores instructions or data relevant to at least one other element of the electronic device 1601. According to an embodiment, the memory 1630 stores software and/or a program 1640. The program 1640 includes a kernel 1641, middleware 1643, an Application Programming Interface (API) 1645, and/or applications 1647. At least some of the kernel 1641, the middleware 1643, and the API 1645 may be referred to as an Operating System (OS).

The kernel 1641 controls or manages system resources (e.g., the bus 1610, the processor 1620, the memory 1630, etc.) that are used to perform operations or functions implemented in the other programs (e.g., the middleware 1643, the API 1645, or the applications 1647). Furthermore, the kernel 1641 may provide an interface through which the middleware 1643, the API 1645, or the application programs 1647 may access the individual elements of the electronic device 1601 to control or manage the system resources.

The middleware 1643 functions as an intermediary for allowing the API 1645 or the applications 1647 to communicate with the kernel 1641 to exchange data.

In addition, the middleware 1643 processes one or more task requests received from the applications 1647 according to priorities thereof. For example, the middleware 1643 may assign a priority for using the system resources (e.g., the bus 1610, the processor 1620, the memory 1630, etc.) of the electronic device 1601 to at least one of the applications 1647. The middleware 1643 performs scheduling or load balancing on the one or more task requests by processing the one or more task requests according to the priorities assigned thereto.

The API 1645 is an interface through which the applications 1647 control functions provided from the kernel 1641 or the middleware 1643, and may include at least one interface or function (e.g., instruction) for file control, window control, image processing, text control, etc.

The input/output interface 1650 functions as an interface that transfers instructions or data input from a user, the first external electronic device 1602, or the second external electronic device 1604 to the other elements of the electronic device 1601. Furthermore, the input/output interface 1650 outputs instructions or data received from the other element(s) of the electronic device 1601 to a user or another external device.

The display 1660 may include a Liquid Crystal Display (LCD), a Light-Emitting Diode (LED) display, an Organic Light-Emitting Diode (OLED) display, a MicroElectroMechanical Systems (MEMS) display, or an electronic paper display. The display 1660, for example, may display various types of contents (e.g., text, images, videos, icons, or symbols) to a user. The display 1660 may include a touch screen and may receive, for example, a touch input, a gesture input, a proximity input, or a hovering input using an electronic pen or a user's body part.

The communication module 1670 sets communication between the electronic device 1601 and the first external electronic device 1602, the second external electronic device 1604, or the server 1606. For example, the communication module 1670 may be connected to the network 1662 through wireless or wired communication to communicate with the second external electronic device 1604 or the server 1606.

The wireless communication may use at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include short range communication 1664. The short range communication 1664 may include at least one of Wi-Fi, Bluetooth, Near Field Communication (NFC), and Global Navigation Satellite System (GNSS). The GNSS may include at least one of a Global Positioning System (GPS), a Global Navigation Satellite System (Glonass), a Beidou Navigation Satellite System (Beidou), and the European Global Satellite-based Navigation System (Galileo) according to an area of usage, a bandwidth, etc. The wired communication may include at least one of a Universal Serial Bus (USB), a High Definition Multimedia Interface (HDMI), Recommended Standard 232 (RS-232), a Plain Old Telephone Service (POTS), etc.

The network 1662 may include at least one of a communication network a computer network (e.g., a LAN or a WAN), the Internet, and a telephone network.

Each of the first and second external electronic devices 1602 and 1604 may be the same or a different type of device from the electronic device 1601.

According to an embodiment of the present disclosure, the server 1606 includes a group of one or more servers.

According to an embodiment, all or some of the operations performed in the electronic device 1601 may be performed in another electronic device or a plurality of electronic devices, e.g., the external electronic devices 1602 and 1604 or the server 1606. According to an embodiment, when the electronic device 1601 has to perform a function or service automatically or in response to a request, the electronic device 1601 may request another electronic device 1602 or 1604 or the server 1606 to perform at least some functions relating thereto instead of, or in addition to, performing the function or service by itself. In this case, the external electronic device 1602 or 1604 or the server 1606 executes the requested function or the additional functions and transfers the result to the electronic device 1601. The electronic device 1601 processes the received result as it is or additionally to provide the requested function or service. To achieve this cloud computing, distributed computing, or client-server computing technology may be used.

Figure 17:
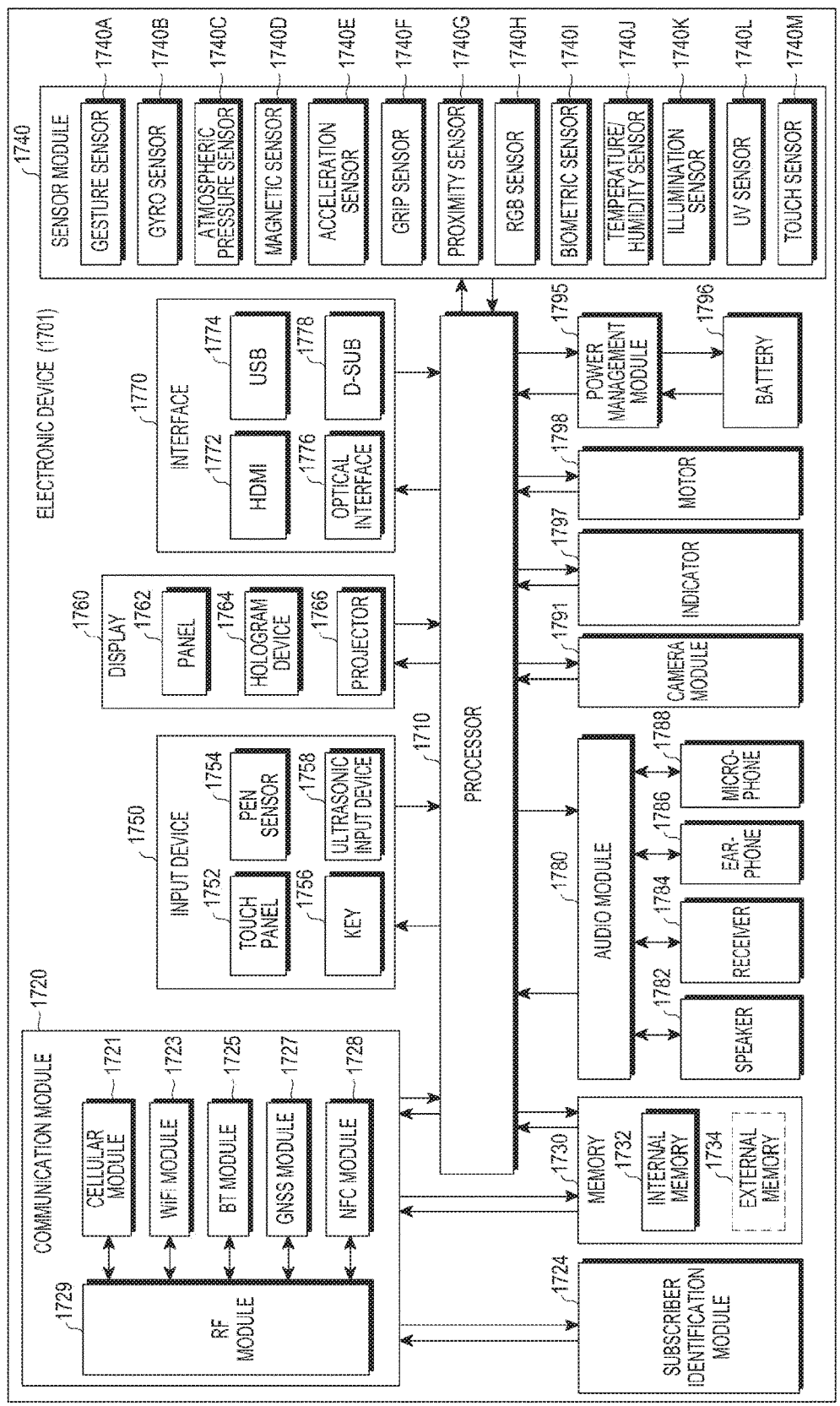
FIG. 17 is a block diagram of a configuration of an electronic device, according to an embodiment of the present disclosure.

FIG. 17 is a block diagram of a configuration of an electronic device, according to an embodiment of the present disclosure.

Referring to FIG. 17, an electronic device 1701 is provided. The electronic device 1701 may include the entirety or a part of the electronic device 1601 illustrated in FIG. 16. The electronic device 1701 includes at least one processor (e.g., an Application Processor (AP)) 1710, a communication module 1720, a subscriber identification module (SIM) card 1724, a memory 1730, a security module 1736, a sensor module 1740, an input device 1750, a display 1760, an interface 1770, an audio module 1780, a camera module 1791, a power management module 1795, a battery 1796, an indicator 1797, and a motor 1798.

The processor 1710 drives an operating system or an application program to control a plurality of hardware or software elements connected thereto and performs various types of data processing and calculations. The processor 1710 may be embodied as a System on Chip (SoC). According to an embodiment, the processor 1710 may further include a Graphic Processing Unit (GPU) and/or an image signal processor. The processor 1710 may include at least some (e.g., a cellular module 1721) of the other elements of the electronic device 1701. The processor 1710 loads, into a volatile memory, instructions or data received from at least one of the other elements (e.g., a non-volatile memory), processes the loaded instructions or data, and stores various data in a non-volatile memory.

The communication module 1720 may have the same or a similar configuration to the communication module 1670 of FIG. 16. The communication module 1720 includes a cellular module 1721, a Wi-Fi module 1723, a Bluetooth module 1725, a GNSS module 1727 (e.g., a GPS module, a Glonass module, a Beidou module, or a Galileo module), an NFC module 1728, and a Radio Frequency (RF) module 1729.

The cellular module 1721 provides a voice call, a video call, a text message service, an Internet service, etc. through a communication network. According to an embodiment, the cellular module 1721 distinguishes and authenticates the electronic device 1701 within a communication network by using the SIM card 1724. According to an embodiment, the cellular module 1721 may perform at least some of the functions that the AP 1710 may provide. According to an embodiment, the cellular module 1721 may include a Communication Processor (CP).

The Wi-Fi module 1723, the Bluetooth module 1725, the GNSS module 1727, or the NFC module 1728 may include a processor for processing data that is transmitted and received through the corresponding module. According to some embodiments, at least some of the cellular module 1721, the Wi-Fi module 1723, the Bluetooth module 1725, the GNSS module 1727, and the NFC module 1728 may be included in one Integrated Chip (IC) or IC package.

The RF module 1729 transmits/receives a communication signal (e.g., an RF signal). The RF module 1729 may include a transceiver, a Power Amp Module (PAM), a frequency filter, a Low Noise Amplifier (LNA), an antenna, etc. According to another embodiment, at least one of the cellular module 1721, the Wi-Fi module 1723, the Bluetooth module 1725, the GNSS module 1727, and the NFC module 1728 transmits/receives an RF signal through a separate RF module.

The SIM card 1724 may include an embedded SIM, and contains unique identification information (e.g., an Integrated Circuit Card Identifier (ICCID)) or subscriber information (e.g., an International Mobile Subscriber Identity (IMSI)).

The memory 1730 (e.g., the memory 1630) may include an internal memory 1732 or an external memory 1734.

The internal memory 1732 may include at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disc drive, or a Solid State Drive (SSD).

The external memory 1734 may include a flash drive, for example, a Compact Flash (CF), a Secure Digital (SD), a Micro Secure Digital (Micro-SD), a Mini Secure Digital (Mini-SD), an eXtreme Digital (xD), a Multi-Media Card (MMC), a memory stick, etc. The external memory 1734 may be functionally and/or physically connected to the electronic device 1701 through various interfaces.

The sensor module 1740 measures a physical quantity or detects the operating state of the electronic device 1701, and converts the measured or detected information into an electrical signal. The sensor module 1740 may include at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a Red-Green-Blue (RGB) sensor 1740H, a biometric sensor 1740I, a temperature/humidity sensor 1740J, an illumination sensor 1740K, an Ultraviolet (UV) sensor 1740L, and a touch sensor 1740M. Additionally or alternatively, the sensor module 1740 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1740 may further include a control circuit for controlling one or more sensors included therein. In some embodiments, the electronic device 1701 may further include a processor, which is configured to control the sensor module 1710, as a part of the processor 1710 or separately from the processor 1710 to control the sensor module 1710 while the processor 1740 is in a sleep state.

The input device 1750 may include a touch panel 1752, a (digital) pen sensor 1754, a key 1756, or an ultrasonic input device 1758.

The touch panel 1752 may use at least one of a capacitive type, a resistive type, an infrared type, and an ultrasonic type. In addition, the touch panel 1752 may further include a control circuit. The touch panel 1752 may further include a tactile layer to provide a tactile reaction to a user.

The (digital) pen sensor 1754 may include a recognition sheet that is a part of the touch panel 1752 or is separate from the touch panel 1752.

The key 1756 may include a physical button, an optical key, or a keypad.

The ultrasonic input device 1758 detects ultrasonic waves, through a microphone 1788, generated by an input means and identifies data corresponding to the detected ultrasonic waves.

The display 1760 (e.g., the display 1660) includes a panel 1762, a hologram device 1764, or a projector 1766.

The panel 1762 may include the same or a similar configuration to the display 1660 illustrated in FIG. 16. The panel 1762 may be implemented to be flexible, transparent, or wearable. The panel 1762, together with the touch panel 1752, may be implemented as a single module.

The hologram device 1764 displays a 3D image in the air by using an interference of light.

The projector 1766 displays an image by projecting light onto a screen. The screen may be located in the interior of or on the exterior of the electronic device 1701. According to an embodiment, the display 1760 may further include a control circuit for controlling the panel 1762, the hologram device 1764, or the projector 1766.

The interface 1770 includes a High-Definition Multimedia Interface (HDMI) 1772, a Universal Serial Bus (USB) 1774, an optical interface 1776, or a D-subminiature (D-sub) 1778. The interface 1770 may be included in the communication module 1670 illustrated in FIG. 16. Additionally or alternatively, the interface 1770 may include a Mobile High-definition Link (MHL) interface, a Secure Digital (SD) card/Multi-Media Card (MMC) interface, or an Infrared Data Association (IrDA) standard interface.

The audio module 1780 bilaterally converts a sound and an electrical signal. At least some elements of the audio module 1780 may be included in the input/output interface 1645 illustrated in FIG. 16. The audio module 1780 processes sound information that is input or output through a speaker 1782, a receiver 1784, earphones 1786, the microphone 1788, etc.

The camera module 1791 photographs a still image and a moving image. According to an embodiment, the camera module 1791 may include one or more image sensors (e.g., a front sensor or a back sensor), a lens, an Image Signal Processor (ISP), or a flash (e.g., an LED or a xenon lamp).

The power management module 1795 manages the power of the electronic device 1701. According to an embodiment, the power management module 1795 may include a Power Management Integrated Circuit (PMIC), a charger Integrated Circuit (IC), or a battery gauge. The PMIC may use a wired and/or wireless charging method. Examples of the wireless charging method include a magnetic resonance method, a magnetic induction method, an electromagnetic method, etc. Additional circuits (e.g., a coil loop, a resonance circuit, a rectifier, etc.) for wireless charging may be further included.

The battery gauge measures the residual quantity, a voltage, a current, or a temperature of the battery 1796.

The battery 1796 may include a rechargeable battery and/or a solar battery.

The indicator 1797 indicates a specific state (e.g., a booting state, a message state, a charging state, etc.) of the electronic device 1701 or a part (e.g., the processor 1710) thereof. The motor 1798 converts an electrical signal into a mechanical vibration and generates a vibration, a haptic effect, etc.

The electronic device 1701 may include a processing unit (e.g., a GPU) for mobile TV support. The processing unit for mobile TV support may process media data according to standards, such as Digital Multimedia Broadcasting (DMB), Digital Video Broadcasting (DVB), mediaFLO™, etc.

Each of the above-described component elements of hardware, according to embodiments of the present disclosure, may be configured with one or more components, and the names of the corresponding component elements may vary based on the type of electronic device.

According to an embodiment of the present disclosure, the electronic device may include at least one of the above-described elements. Some of the above-described elements may be omitted from the electronic device, or the electronic device may further include additional elements. Further, some of the elements of the electronic device may be coupled to form a single entity while performing the same functions as those of the corresponding elements before the coupling.

Figure 18:
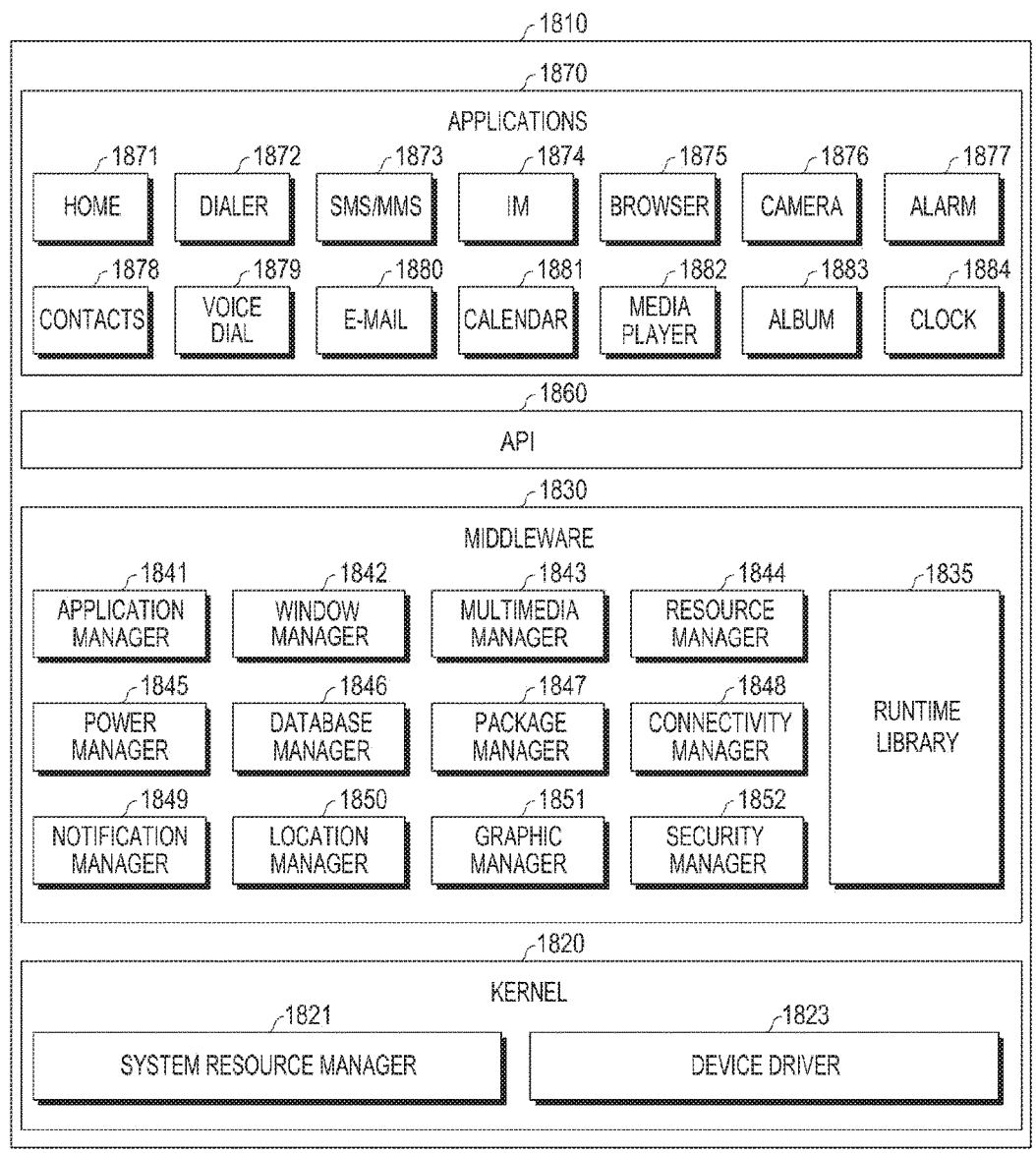
FIG. 18 is a block diagram of a configuration of a program module structure, according to an embodiment of the present disclosure.

FIG. 18 is a block diagram of a configuration of a program module structure, according to an embodiment of the present disclosure.

Referring to FIG. 18, a program module 1810 (e.g., the program 140) is provided. The program module 1810 may include an Operating System (OS) that controls resources relating to an electronic device (e.g., the electronic device 1601) and/or various applications (e.g., the application programs 147) that are driven on the operating system.

The operating system may be, for example, Android, iOS, Windows, Symbian, Tizen, Bada, etc.

The program module 1810 includes a kernel 1820, middleware 1830, an Application Programming Interface (API) 1860, and/or applications 1870.

At least a part of the program module 1810 may be preloaded in the electronic device 1601, or may be downloaded from an external electronic device, e.g., the first external electronic device 1602, the second external electronic device 1604, or the server 1606).

The kernel 1820 (e.g., the kernel 141) includes a system resource manager 1821 and/or a device driver 1823.

The system resource manager 1821 controls, allocates, or retrieves system resources. According to an embodiment, the system resource manager 1821 may include a process management unit, a memory management unit, a file system management unit, etc.

The device driver 1823 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 1830 provides a function commonly required by the applications 1870, or may provide various functions to the applications 1870 through the API 1860 to allow the applications 1870 to efficiently use the limited system resources within the electronic device 1601. According to an embodiment, the middleware 1830 (e.g., the middleware 143) includes at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The runtime library 1835 is a library module that a compiler uses in order to add a new function through a programming language while the applications 1870 are being executed. The runtime library 1835 performs input/output management, memory management, functionalities for arithmetic functions, etc.

The application manager 1841 manages a life cycle of at least one of the applications 1870.

The window manager 1842 manages Graphical User Interface (GUI) resources used for a screen of the electronic device 1601.

The multimedia manager 1843 identifies formats required to reproduce various types of media files and encodes/decodes a media file by using a coder/decoder (codec) suitable for the corresponding format.

The resource manager 1844 manages resources, such as a source code, a memory, a storage space, etc. of at least one of the applications 1870.

The power manager 1845 operates together with a Basic Input/Output System (BIOS) to manage a battery or power and provides power information required for the operation of the electronic device 1601.

The database manager 1846 generates, searches, and/or changes a database to be used by at least one of the applications 1870.

The package manager 1847 manages the installation or update of an application that is distributed in the form of a package file.

The connectivity manager 1848 manages a wireless connection, such as Wi-Fi or Bluetooth.

The notification manager 1849 displays or notifies a user of an event, such as an arrival of a message, an appointment, a proximity notification, etc., in such a manner as not to disturb the user.

The location manager 1850 manages the location information of the electronic device 1601.

The graphic manager 1851 manages a graphic effect to be provided to a user or a user interface relating to the graphic effect.

The security manager 1852 provides various security functions required for system security, user authentication, etc. According to an embodiment, when the electronic device 1601 has a telephone call function, the middleware 1830 may further include a telephony manager for managing a voice or video call function of the electronic device 1601.

The middleware 1830 may include a middleware module that forms a combination of various functions of the above-described elements 1835 to 1852. The middleware 1830 may provide a module specialized for each type of OS in order to provide a differentiated function. Furthermore, the middleware 1830 may dynamically delete some of the existing elements or add new elements.

The API 1860 (e.g., the API 1645) is a set of API programming functions, and may be provided with a different configuration according to an OS. For example, in the case of Android or iOS, one API set may be provided for each platform, and in the case of Tizen, two or more API sets may be provided for each platform.

The applications 1870 (e.g., the application programs 147) includes one or more applications that can perform functions, such as home 1871, dialer 1872, SMS/MMS 1873, Instant Message (IM) 1874, browser 1875, camera 1876, alarm 1877, contacts 1878, voice dialer 1879, e-mail 1880, calendar 1881, media player 1882, album 1883, and clock 1884. The applications 1870 may additionally include applications that can provide a health care function (e.g., measuring exercise quantity or blood sugar level) or environment information (e.g., atmospheric pressure, humidity, or temperature information).

According to an embodiment, the applications 1870 may include an information exchange application that supports information exchange between the electronic device 1601 and an external electronic device, 1602 or 1604. The information exchange application may include a notification relay application for forwarding specific information to an external electronic device or a device management application for managing an external electronic device.

The notification relay application includes a function of forwarding, to the external electronic device 1602 or 1604, notification information generated from the other applications 1870 of the electronic device 1670 (e.g., the SMS/MMS application, the e-mail application, the health management application, the environmental information application, etc.). Furthermore, the notification relay application receives notification information from the external electronic device 1602 or 1604 and provides the received notification information to a user.

The device management application manages (e.g., installs, deletes, or updates) at least one function of the external electronic device 1602 or 1604 that communicates with the electronic device 1601 (e.g., a function of turning on/off the external electronic device itself (or some components thereof) or a function of adjusting the brightness (or resolution) of the display), applications operating in the external electronic device, or services provided by the external electronic device (e.g., a call service, a message service, etc.).

According to an embodiment, the applications 1870 may include an application (e.g., a health care application of a mobile medical appliance, etc.) that is specified according to the attribute of the external electronic device 1602 or 1604. The applications 1870 may include an application that is received from the server 1606 or the external electronic device 1602 or 1604. The applications 1870 may include a preloaded application or a third party application that may be downloaded from the server 1606. The names of the components of the program module 1810 may be changed according to the type of operating system.

According to an embodiment of the present disclosure, at least some of the programming module 1810 may be embodied as software, firmware, hardware, or a combination of at least two of them. At least some of the program module 1810 may be implemented (e.g., executed) by the processor (e.g., the processor 1410). At least some of the program module 1810 may include a module, a program, a routine, a set of instructions, and/or a process for performing one or more functions.

Figure 19:
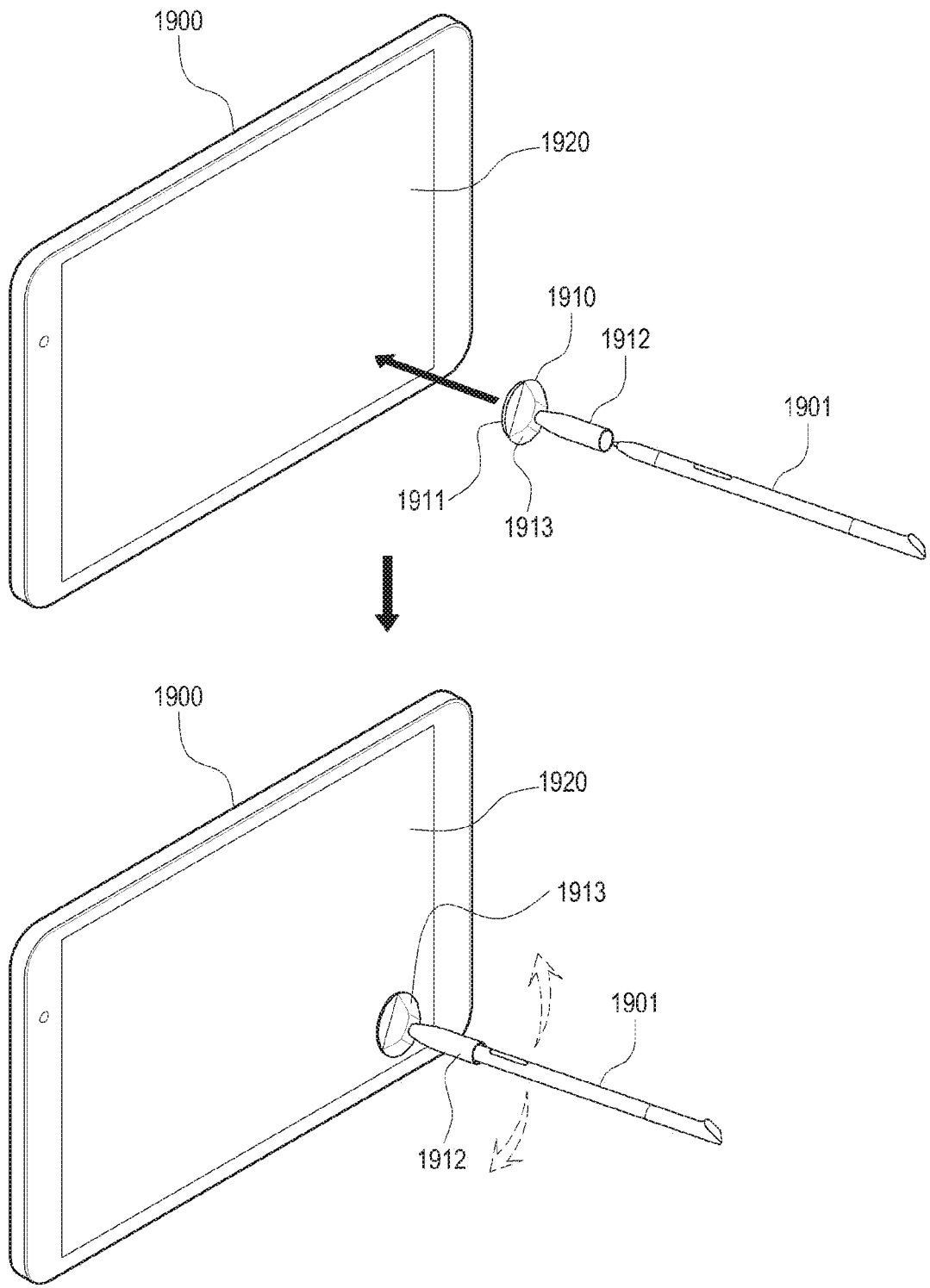
FIG. 19 illustrates an accessory for fixing a pen coupled to an electronic device, according to an embodiment of the present disclosure.

FIG. 19 illustrates an accessory for fixing a pen coupled to an electronic device, according to an embodiment of the present disclosure.

Referring to FIG. 19, an accessory 1910 coupled to an electronic device 1900 is shown. The accessory 1910 includes an attaching member 1911, a pen insertion member 1912, and a pen rotating member 1913.

The attaching member 1911 includes a magnetic material or a vacuum absorption member and may be attached to one surface of the electronic device 1900.

The pen insertion member 1912 includes a cavity into which a part of the pen 1901 may be inserted, and when the pen 1901 is inserted into the pen insertion member 1912, the height of the pen 1901 from the electronic device 1900, to which the accessory 1910 is attached, may be fixed.

According to an embodiment of the present disclosure, the electronic device 1900 includes a touch panel 1920 on at least one surface thereof, and when the accessory 1910 is attached to the surface in which the touch panel 1920 is included, the electronic device 1900 identifies an input of the pen 1901 inserted into the accessory 1910.

The pen rotating member 1913 includes a conductive material and is configured to include a pivot structure between the center of the accessory 1910 and the pen insertion member 1912. The pen 1901 may be inserted into the pen insertion member 1912 while the pen point of the pen 1901 is directed toward the center of the accessory 1910.

According to an embodiment of the present disclosure, when the pen 1901 is inserted into the pen insertion member 1912, a user may change the angle of the pen 1901, or may rotate the pen 1901, by the pen rotating member 1913 while the pen point is fixed to the center of the accessory 1910. The electronic device 1900 determines the angle or the rotational direction of the pen insertion member 1912 according to a pattern in which the conductive material included in the pen rotating member 1913 is input.

According to an embodiment of the present disclosure, the electronic device 1900 identifies the changed angle or rotational direction of the pen 1901 to be a joystick input and controls (e.g., moves or selects) a displayed object.

The term "module" as used herein may refer to a unit including one of hardware, software, and firmware or a combination of them. The "module" may be interchangeably used with the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure, may be implemented by a command or instruction stored in a computer-readable storage medium in a programming module form. The instruction, when executed by a processor (e.g., the processor 1620), causes the one or more processors to execute the function corresponding to the instruction. The computer-readable storage medium may be, for example, the memory 1630.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), etc. In addition, the program instructions may include high-level language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules, according to various embodiments of the present disclosure, may include at least one of the above described elements, exclude some of the elements, or further include other additional elements.

The operations performed by the modules, programming module, or other elements, according to various embodiments of the present disclosure, may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure. Therefore, the scope of the present disclosure is defined, not by the detailed description and embodiments, but by the following claims and their equivalents.

What is claimed is:

1. An accessory detachably coupled to an electronic device, comprising:
    a body part located on at least one surface of the electronic device when the accessory is attached to the electronic device;
    an opening into which a part of a pen is inserted;
    a depression into which a pen point of the pen is inserted; and
    a pen accommodation part that comprises a lateral portion located between the opening and the depression and a cavity located below the lateral portion to allow the pen to move when inserted,
    wherein the body part is formed of a magnetic material so as to be attached to and detached from the electronic device, and
    wherein the cavity contains a conductive material through which a signal generated from the pen, when inserted into the depression, is transferred to a touch panel of the electronic device.

2. The accessory of claim 1, wherein the accessory comprises a keypad that includes one or more physical buttons, and
wherein the pen accommodation part is located on at least one surface of the keypad.

3. The accessory of claim 1, wherein the accessory is configured such that the pen accommodation part is located at a preset distance from the touch panel when the accessory is mounted on the electronic device, and
the signal generated from the pen is transferred to the touch panel of the electronic device, when the pen is inserted through the pen accommodation part.

4. The accessory of claim 1, wherein the accessory further comprises a pivot structure between a center of the accessory and the pen accommodation part, and at least one of an angle of the pen and a moving direction of the pen changes according to at least one of an angle of the pivot structure and a rotational direction of the pivot structure, when the pen is inserted through the pen accommodation part.

5. The accessory of claim 1, wherein a signal generated through the magnetic material of the body part is transferred to the electronic device when the accessory is attached to the electronic device.

6. An electronic device having an accessory detachably coupled thereto, comprising:
a display;
a touch panel; and
a processor,
wherein the accessory comprises:
a body part that is formed of a magnetic material so as to be attached to and detached from the touch panel, and
a fixing member that has a cavity through which a pen moves when a pen point of the pen is inserted, and
wherein the processor:
identifies an input of the pen, through the touch panel, when at least one of the pen is detected for a first predetermined period of time and the pen is detected with a predetermined signal strength, and the accessory is detected to be attached to the touch panel,
sets coordinates of the pen according to the identified input of the pen, and
controls an object, which is displayed on the display, according to a movement of the pen in the set coordinates.

7. The electronic device of claim 6, further comprising:
an input/output unit,
wherein the processor further identifies the movement of the pen in the set coordinates, and controls to output data, through the input/output unit, according to the identified movement of the pen.

8. The electronic device of claim 6, further comprising:
a memory that stores information relating to the movement of the pen,
wherein the processor further identifies the information stored in the memory, and determines information corresponding to a strength of a signal input from the pen to be a location of the pen.

9. The electronic device of claim 8, wherein the processor further identifies an angle between the pen and the electronic device based on the location of the pen and determines the location of the pen considering a weighting value that is calculated based on the identified angle.

10. The electronic device of claim 8, wherein the processor further identifies at least one of a time during which the input of the pen is maintained and a moving speed of the pen, and determines the location of the pen considering a weighting value that is calculated based on at least one of the identified duration time and the identified moving speed.

11. The electronic device of claim 7, wherein the processor further controls to output, through the input/output unit, data for informing at least one of whether the location of the pen is fixed for a second predetermined period of time and whether the accessory is mounted on the electronic device.

12. The electronic device of claim 6, wherein the processor further controls the object displayed on the display to be oriented in a second direction, opposite to a first direction, in response to a hovering input that is entered by the pen in the first direction from a first point on the touch panel to a second point on the touch panel.

13. A method of processing an input in an electronic device, comprising:
detecting a signal generated from a pen mounted on a fixing member, when the signal generated from the pen for informing that the pen is mounted on the fixing member is received through a touch panel of the electronic device;
calculating an angle between the pen and the touch panel of the electronic device by identifying a location of the pen that corresponds to a strength of an input of the pen, when the input of the pen is received with a predetermined strength for a predetermined period of time; and
controlling an object displayed through the electronic device, based on the calculated angle.

14. The method of claim 13, further comprising:
identifying a movement of the pen in set coordinates; and
outputting data according to the identified movement of the pen.

15. The method of claim 13, further comprising:
identifying information stored in relation to movement of the pen; and
determining information corresponding to the strength of the signal input from the pen to be the location of the pen based on the stored information.

16. The method of claim 15, further comprising:
determining the location of the pen considering a weighting value that is calculated based on the calculated angle.

17. The method of claim 16, further comprising:
outputting data for informing at least one of whether the location of the pen is fixed for a predetermined period of time, and whether an accessory is mounted on the electronic device.

18. The method of claim 13, further comprising:
identifying at least one of a time during which the input of the pen is maintained and a moving speed of the pen; and
determining the location of the pen considering a weighting value that is calculated based on at least one of the identified duration time and the identified moving speed.

19. The method of claim 13, further comprising:
controlling the displayed object to be oriented in a second direction, opposite to a first direction, in response to a hovering input that is entered by the pen in the first direction from a first point on the touch panel to a second point on the touch panel.

* * * * *